(12) United States Patent
Conrad et al.

(10) Patent No.: US 6,312,594 B1
(45) Date of Patent: Nov. 6, 2001

(54) INSERT FOR A CYCLONE SEPARATOR

(75) Inventors: Wayne Ernest Conrad; Helmut Gerhard Conrad; Ted Szylowiec, all of Hampton (CA)

(73) Assignee: G.B.D. Corp. (KY)

( * ) Notice: Subject to any disclaimer, the term of this patent is extended or adjusted under 35 U.S.C. 154(b) by 0 days.

(21) Appl. No.: 09/136,364

(22) Filed: Aug. 19, 1998

Related U.S. Application Data

(63) Continuation of application No. 09/136,364, filed on Aug. 19, 1998.

(51) Int. Cl.[7] .................................................. B04C 5/185
(52) U.S. Cl. ................................. 210/215.2; 210/512.1; 210/788; 55/459.1; 55/459.2; 55/459.3; 55/459.4; 55/454.5; 55/345; 55/429
(58) Field of Search ........................ 55/345, 429, 459.1, 55/459.2, 459.3, 459.4, 459.5, DIG. 83; 210/512.1, 512.2, 787, 788

(56) References Cited

U.S. PATENT DOCUMENTS

| Re. 32,257 | 10/1986 | Dyson . |
|---|---|---|
| D. 305,269 | 12/1989 | Dyson . |
| D. 343,707 | 1/1994 | Dyson . |
| D. 382,679 | 8/1997 | Dyson . |
| 450,372 | 4/1891 | Morse . |
| 883,413 | 3/1908 | Mahony . |
| 1,023,082 | 4/1912 | Kluge . |
| 1,127,896 | 2/1915 | Keller . |
| 1,369,939 | 3/1921 | Shaffer . |
| 1,752,231 | 3/1930 | Clarkson . |
| 1,798,510 | 3/1931 | Winslow et al. . |
| 1,826,798 | 10/1931 | Lee . |
| 1,897,144 | 2/1933 | Prouty . |
| 2,014,287 | 10/1935 | Newman . |
| 2,143,421 | 1/1939 | Loehr et al. . |

(List continued on next page.)

FOREIGN PATENT DOCUMENTS

| 2156069 | 6/1969 | (CA) . |
|---|---|---|
| 54488 | 5/1985 | (CA) . |
| 2104136 | 6/1994 | (CA) . |
| 260 776 | 11/1926 | (DE) . |
| 1 251 139 | 9/1967 | (DE) . |
| 34 35 214 | 4/1986 | (DE) . |
| 52195 | 9/1936 | (DK) . |
| 69708 | 1/1949 | (DK) . |
| 0 408 862 | 1/1991 | (EP) . |
| 1 016 090 | 10/1952 | (FR) . |
| 1 037 980 | 9/1953 | (FR) . |
| 2 670 137 | 6/1992 | (FR) . |
| 762070 | 12/1950 | (GB) . |
| 2 108 013 | 5/1983 | (GB) . |
| 6 400 783 | 8/1964 | (NL) . |
| 148023 | 10/1961 | (SU) . |
| 1042812 | 9/1983 | (SU) . |
| 82 00451 | 2/1982 | (WO) . |
| WO 96/19293 | 6/1996 | (WO) . |
| WO 96/19294 | 6/1996 | (WO) . |
| 96 27446 | 9/1996 | (WO) . |
| WO 98/10691 | 3/1998 | (WO) . |
| WO 98/23381 | 6/1998 | (WO) . |
| WO 98/27857 | 7/1998 | (WO) . |
| WO 98/33424 | 8/1998 | (WO) . |

*Primary Examiner*—David A. Reifsnyder
(74) *Attorney, Agent, or Firm*—Reed Smith Hazel & Thomas LLP

(57) ABSTRACT

A cyclone separator having an improved efficiency to remove a broader spectrum of contained particles is disclosed. The cyclone separator is provided with a member positioned to interact with at least the inner portion of a fluid circulating within the cyclone cavity to impart changes in the acceleration of the fluid as it rotates within the cyclone cavity.

48 Claims, 31 Drawing Sheets

U.S. PATENT DOCUMENTS

| | | |
|---|---|---|
| 2,171,248 | 9/1939 | Van Berkel . |
| 2,392,872 | 1/1946 | Wolfe . |
| 2,397,872 | 4/1946 | Kovacs . |
| 2,397,980 | 4/1946 | Petri . |
| 2,402,845 | 6/1946 | Rodman . |
| 2,405,625 | 8/1946 | Whiton et al. . |
| 2,608,268 | 8/1952 | Gerber . |
| 2,681,124 | 6/1954 | Van der Kolk . |
| 2,822,060 | 2/1958 | Udovich . |
| 2,993,223 | 7/1961 | Krammes . |
| 3,200,568 | 8/1965 | McNeil . |
| 3,235,090 | 2/1966 | Bose et al. . |
| 3,283,480 | 11/1966 | Szego . |
| 3,320,727 | 5/1967 | Farley et al. . |
| 3,425,192 | 2/1969 | Davis . |
| 3,501,014 | 3/1970 | Fitch, Jr. et al. . |
| 3,535,854 | 10/1970 | Taylor . |
| 3,853,518 | 12/1974 | Tu et al. . |
| 3,877,902 | 4/1975 | Eriksson et al. . |
| 3,925,045 | 12/1975 | Cheng . |
| 3,953,184 * | 4/1976 | Stockford et al. .................. 55/459.1 |
| 3,955,236 | 5/1976 | Mekelburg . |
| 4,005,998 | 2/1977 | Gorman . |
| 4,141,698 | 2/1979 | Kihlstedt et al. . |
| 4,162,149 | 7/1979 | Mekelburg . |
| 4,198,290 | 4/1980 | Summers . |
| 4,251,368 | 2/1981 | Colman et al. . |
| 4,268,288 | 5/1981 | Coombs . |
| 4,326,862 | 4/1982 | Suzuki . |
| 4,345,572 | 8/1982 | Suzuki et al. . |
| 4,352,684 | 10/1982 | Dietz . |
| 4,373,228 | 2/1983 | Dyson . |
| 4,377,882 | 3/1983 | Dyson . |
| 4,390,426 | 6/1983 | Vicard . |
| 4,398,928 | 8/1983 | Kunsagi . |
| 4,443,234 | 4/1984 | Carlsson . |
| 4,571,772 | 2/1986 | Dyson . |
| 4,573,236 | 3/1986 | Dyson . |
| 4,588,423 | 5/1986 | Gillingham et al. . |
| 4,593,429 | 6/1986 | Dyson . |
| 4,643,748 | 2/1987 | Dyson . |
| 4,756,729 | 7/1988 | Brunnmair et al. . |
| 4,826,515 | 5/1989 | Dyson . |
| 4,848,991 * | 7/1989 | Bielefeldt ............................ 55/459.3 |
| 4,853,008 | 8/1989 | Dyson . |
| 4,853,011 | 8/1989 | Dyson . |
| 5,062,870 | 11/1991 | Dyson . |
| 5,078,761 | 1/1992 | Dyson . |
| 5,090,976 | 2/1992 | Dyson . |
| 5,101,532 | 4/1992 | Dyson et al. . |
| 5,145,499 | 9/1992 | Dyson . |
| 5,160,356 | 11/1992 | Dyson . |
| 5,267,371 | 12/1993 | Soler et al. . |
| 5,350,432 | 9/1994 | Lee . |
| 5,558,697 | 9/1996 | Dyson et al. . |
| 5,591,253 | 1/1997 | Altman et al. . |
| 5,755,007 | 5/1998 | Dyson . |

\* cited by examiner

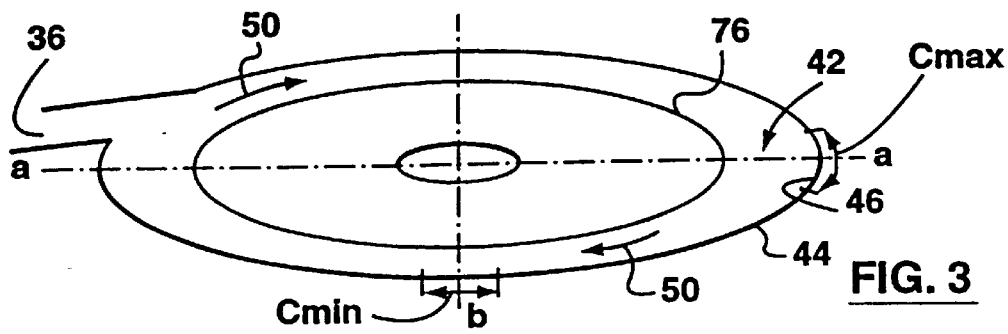
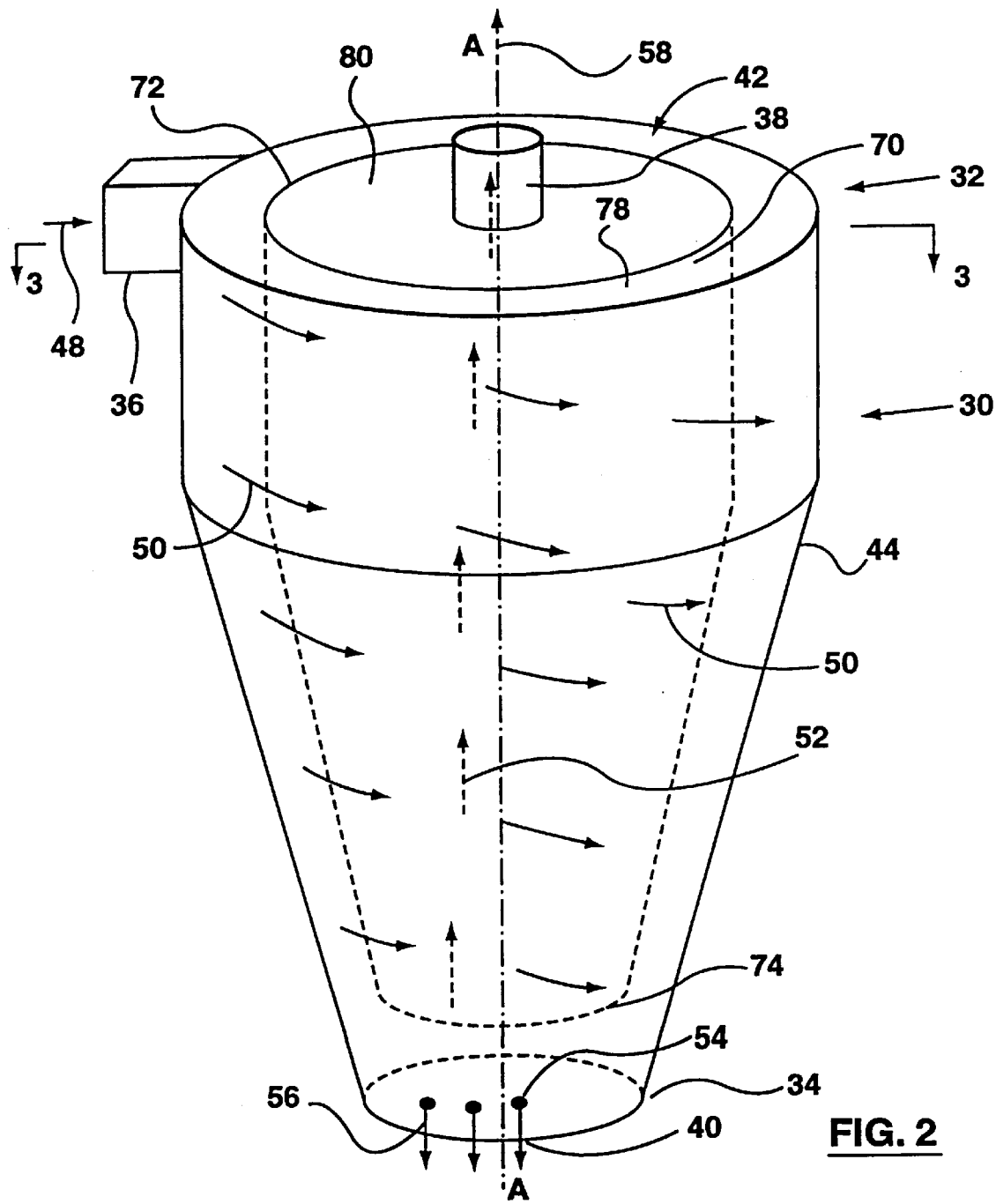

INSERT FOR A CYCLONE SEPARATOR

This application is a continuation application of U.S. Application No. 09/136,364 filed on Aug. 19, 1998.

FIELD OF THE INVENTION

This invention relates to an improved apparatus for separating a component from a fluid stream. In one embodiment, the fluid may be a gas having solid and/or liquid particles and or a second gas suspended, mixed, or entrained therein and the separator is used to separate the particles and/or the second gas from the gas stream. In an alternate embodiment, the fluid may be a liquid which has solid particles, and/or a second liquid and/or a gas suspended, mixed, or entrained therein and the separator is used to remove the solid particles and/or the second liquid and/or the gas from the liquid stream. The improved separator may be used in various applications including vacuum cleaners, liquid/liquid separation, smoke stack scrubbers, pollution control devices, mist separators, an air inlet for a turbo machinery and as pre-treatment equipment in advance of a pump for a fluid (either a liquid, a gas or a mixture thereof) and other applications where it may be desirable to remove particulate or other material separable from a fluid in a cyclone separator.

BACKGROUND OF THE INVENTION

Cyclone separators are devices that utilize centrifugal forces and low pressure caused by spinning motion to separate materials of differing density, size and shape. FIG. 1 illustrates the operating principles in a typical cyclone separator (designated by reference numeral 10 in FIG. 1) which is in current use. The following is a description of the operating principles of cyclone separator 10 in terms of its application to removing entrained particles from a gas stream, such as may be used in a vacuum cleaner.

Cyclone separator 10 has an inlet pipe 12 and a main body comprising upper cylindrical portion 14 and lower frusto-conical portion 16. The particle laden gas stream is injected through inlet pipe 12 which is positioned tangentially to upper cylindrical portion 14. The shape of upper cylindrical portion 14 and frusto-conical portion 16 induces the gas stream to spin creating a vortex. Larger or more dense particles are forced outwards to the walls of cyclone separator 10 where the drag of the spinning air as well as the force of gravity causes them to fall down the walls into an outlet or collector 18. The lighter or less dense particles, as well as the gas medium itself, reverses course at approximately collector G and pass outwardly through the low pressure centre of separator 10 and exit separator 10 via gas outlet 20 which is positioned in the upper portion of upper cylindrical portion 14.

The separation process in cyclones generally requires a steady flow free of fluctuations or short term variations in the flow rate. The inlet and outlets of cyclone separators are typically operated open to the atmosphere so that there is no pressure difference between the two. If one of the outlets must be operated at a back pressure, both outlets would typically be kept at the same pressure.

When a cyclone separator is designed, the principal factors which are typically considered are the efficiency of the cyclone separator in removing particles of different diameters and the pressure drop associated with the cyclone operation. The principle geometric factors which are used in designing a cyclone separator are the inlet height (A); the inlet width (B); the gas outlet diameter (C); the outlet duct length (D); the cone height (Lc); the dirt outlet diameter (G); and, the cylinder height (L)

The value $d_{50}$ represents the smallest diameter particle of which 50 percent is removed by the cyclone. Current cyclones have a limitation that the geometry controls the particle removal efficiency for a given particle diameter. The dimensions which may be varied to alter the d50 value are features (A)–(D), (G), (L) and (Lc) which are listed above.

Typically, there are four ways to increase the small particle removal efficiency of a cyclone. These are (1) reducing the cyclone diameter; (2) reducing the outlet diameter; (3) reducing the cone angle; and (4) increasing the body length. If it is acceptable to increase the pressure drop, then an increase in the pressure drop will (1) increase the particle capture efficiency; (2) increase the capacity and (3) decrease the underflow to throughput ratio.

In terms of importance, it appears that the most important parameter is the cyclone diameter. A smaller cyclone diameter implies a smaller $d_{50}$ value by virtue of the higher cyclone speeds and the higher centrifugal forces which may be achieved. For two cyclones of the same diameter, the next most important design parameter appears to be L/d, namely the length of the cylindrical section 14 divided by the diameter of the cyclone and Lc/d, the length of the conical section 16 divided by the width of the cone. Varying L/d and Lc/d will affect the $d_{50}$ performance of the separation process in the cyclone.

Typically, the particles which are suspended or entrained in a gas stream are not homogeneous in their particle size distribution. The fact that particle sizes take on a spectrum of values often necessitates that a plurality of cyclonic separators be used in series. For example, the first cyclonic separator in a series may have a large $d_{50}$ specification followed by one with a smaller $d_{50}$ specification. The prior art does not disclose any method by which a single cyclone may be tuned over the range of possible $d_{50}$ values.

An example of the current limitation in cyclonic separator design is that which has been recently applied to vacuum cleaner designs. In U.S. Pat. Nos. 4,373,228; 4,571,772; 4,573,236; 4,593,429; 4,643,748; 4,826,515; 4,853,008; 4,853,011; 5,062,870; 5,078,761; 5,090,976; 5,145,499; 5,160,356; 5,255,411; 5,358,290; 5,558,697; and RE 32,257, a novel approach to vacuum cleaner design is taught in which sequential cyclones are utilized as the filtration medium for a vacuum cleaner. Pursuant to the teaching of these patents, the first sequential cyclone is designed to be of a lower efficiency to remove only the larger particles which are entrained in an air stream. The smaller particles remain entrained in the gas stream and are transported to the second sequential cyclone which is frusto-conical in shape. The second sequential cyclone is designed to remove the smaller particles which are entrained in the air stream. If larger particles are carried over into the second cyclone separator, then they will typically not be removed by the second cyclone separator but exit the frusto-conical cyclone with the gas stream.

Accordingly, the use of a plurality of cyclone separators in a series is documented in the art. It is also known how to design a series of separators to remove entrained or suspended material from a fluid stream. Such an approach has two problems. First, it requires a plurality of separators. This requires additional space to house all of the separators and, secondly additional material costs in producing each of the separators. The second problem is that if any of the larger material is not removed prior to the fluid stream entering the next cyclone separator, the subsequent cyclone separator typically will allow such material to pass therethrough as it is only designed to remove smaller particles from the fluid stream.

SUMMARY OF THE PRESENT INVENTION

In accordance with one embodiment of the instant invention, there is provided an insert for a cyclone separator for separating a material from a fluid, the separator having a longitudinally extending body and a wall, the wall having an inner surface and defining an internal cavity having an outer portion in which the fluid rotates when the separator is in use and an inner portion, the insert comprising a distinct member positioned within the longitudinally extending body to impinge upon at least a portion of the fluid as it rotates within the cavity and change the velocity of that portion of the fluid and cause some of the material to be separated from the fluid while permitting the fluid to maintain sufficient momentum to continue its rotational motion within the body.

In accordance with another embodiment of the instant invention, there is provided an insert for a cyclone separator for separating a material from a fluid, the separator having a longitudinally extending body and a wall, the wall having an inner surface and defining an internal cavity in which the fluid rotates when the separator is in use, the insert comprising a member having an outer wall spaced from the inner surface and configured to impart changes in the rate of acceleration to at least a portion of the fluid as it rotates within the cavity causing some of the material to be separated from the fluid.

In accordance with another embodiment of the instant invention, there is provided an insert for a cyclone separator for separating a material from a fluid, the separator having a longitudinally extending body defining a longitudinal axis and a wall, the wall having an inner surface which defines an internal cavity having an outer portion in which the fluid rotates when the separator is in use and an inner portion, the insert comprising a member positioned in the inner portion and having an outer wall which is positioned to interact with at least a portion of the fluid as it rotates in the outer portion of the cavity to impart to the portion of the fluid different fluid flow characteristics compared to those of the fluid rotating in the outer portion of the cavity which promote the separation of the material from the fluid.

In one embodiment, the insert may be centrally positioned within the cavity and extend outwardly to impinge upon the portion of the fluid.

In another embodiment, the outer wall is configured to continuously impart changes in the rate of acceleration to the portion of the fluid as it rotates within the cavity.

In another embodiment, the outer wall of the insert interacts with the portion of the fluid to impart to the portion of the fluid a different speed, a different direction of travel or a different velocity compared to that of the fluid rotating in the outer portion of the cavity.

In another embodiment, the outer wall of the insert is configured to create an area in the cavity wherein the fluid is travelling at a velocity insufficient to re-entrain all of the separated material. The area may extend longitudinally. Further, the area may have a receiving portion for receiving the material which is separated from the fluid. Alternately, the area may extend longitudinally for a finite length and the insert may be configured to create a plurality of areas at spaced intervals along at least a portion of the length of the insert. If the separator is vertically disposed, the receiving portion is may be positioned towards the lower end of the separator and comprises a collecting chamber in which the separated material is collected. If the separator is vertically disposed, the receiving portion may be positioned towards the lower end of the separator and be in flow communication with a chamber downstream thereof.

In another embodiment, the rotation of the fluid in the outer portion defines an outer cyclone and the outer wall of the insert is configured to interact with the portion of the fluid to cause the portion to rotate to define a second cyclone between the outer wall of the insert and the outer cyclone. The outer wall of the insert may have at least one recess provided therein.

In another embodiment, the outer wall of the insert is positioned and configured to direct the portion of the fluid into the inner portion of the cavity.

In another embodiment, the outer wall of the insert is configured to interact with the portion of the fluid to create a dead air space between the outer wall of the insert and the outer portion of the cavity.

In transverse section, the shape of the insert may be circular, a polygon, a continuous n-differentiable curve wherein $n \geq 2$ and the second differential is not zero everywhere swept 360 degrees around the longitudinal axis, a closed non-circular convex closed path or a helix.

In accordance with another embodiment of the instant invention, there is provided a cyclone separator for separating a material from a fluid comprising:

(a) a longitudinally extending body having a wall and defining a longitudinal axis, the wall having an inner surface which defines an internal cavity having an outer portion in which the fluid rotates when the separator is in use and an inner portion; and, (b) an insert comprising a member having an outer wall spaced from the inner surface and positioned to interact with at least a portion of the fluid as it rotates in the outer portion of the cavity to impart to that portion of the fluid with which it interacts different fluid flow characteristics compared to those of the fluid rotating in the outer portion of the cavity which promote the separation of the material from the fluid.

Preferably, the outer wall of the insert is spaced at least 0.1 inches from the inner surface and more preferably, at least 0.125 inches.

In one embodiment, at least a portion of the inner surface and at least a portion of the outer wall of the insert each have a portion which is similarly configured.

In another embodiment, at least a portion of the inner surface and at least a portion of the outer wall of the insert are each in the shape of a continuous n-differentiable curve wherein $n \geq 2$ and the second differential is not zero everywhere swept 360 degrees around the longitudinal axis.

In another embodiment, the internal cavity has, in transverse section, an inner portion in which the fluid rotates when the separator is in use and at least one outer portion positioned external to the inner portion and contiguous therewith, the outer portion of the cavity extending outwardly from the inner portion of the cavity and defining a zone in which at least a portion of the fluid expands outwardly as it rotates in the plane defined by the transverse section, the portion of the fluid in the outer portion of the cavity having different fluid flow characteristics compared to those of the fluid rotating in the inner portion of the cavity which promote the separation of the material from the fluid.

In another embodiment, in transverse section, the wall extends in a continuous closed path and has a non-baffled inner surface which defines an internal cavity, the internal cavity having an inner portion in which the fluid rotates when the separator is in use, and at least one outer portion positioned external to the inner portion and contiguous therewith defining a zone in which the wall is configured to impart to at least a portion of the fluid as it rotates in the plane defined by the transverse section different fluid flow characteristics compared to those of the fluid rotating in the inner portion of the cavity which promote the separation of the material from the fluid.

In another embodiment, the inner surface of the wall is defined by, in transverse section, a continuous non-circular convex closed path, the cavity having an inner portion positioned within the non-circular convex closed path and at least one outer portion between the inner portion and the non-circular convex closed path.

The separator may be a dirt filter for a vacuum cleaner, an air inlet for turbo machinery, treatment apparatus positioned upstream of a fluid pump, treatment apparatus positioned upstream of a pump for a gas, treatment apparatus positioned upstream of a pump for a liquid or the like.

By designing a cyclone separator according to the instant invention, the parameters L/d and Lc/d may vary continuously and differentiably along the length of the cyclone axis. Thus, a cyclone may be designed which will have a good separation efficiency over a wider range of particle sizes than has heretofore been known. Accordingly, one advantage of the present invention is that a smaller number of cyclones may be employed in a particular application than have been used in the past. It will be appreciated by those skilled in the art that where, heretofore, two or more cyclones might have been required for a particular application, that only one cyclone may be required. Further, whereas in the past three to four cyclones may have been required, by using the separator of the instant intention, only two cyclones may be required. Thus, in one embodiment of the instant invention, the cyclone separator may be designed for a vacuum cleaner and may in fact comprise only a single cyclone as opposed to a multi-stage cyclone as is known in the art.

DESCRIPTION OF THE DRAWING FIGURES

These and other advantages of the instant invention will be more fully and completely understood in accordance with the following description of the preferred embodiments of the invention in which:

FIG. 2 is a perspective view of a cyclone separator according to the instant invention;

FIG. 3 is a cross-section of the cyclone separator of FIG. 2 taken along the line 3—3;

Figure 1:
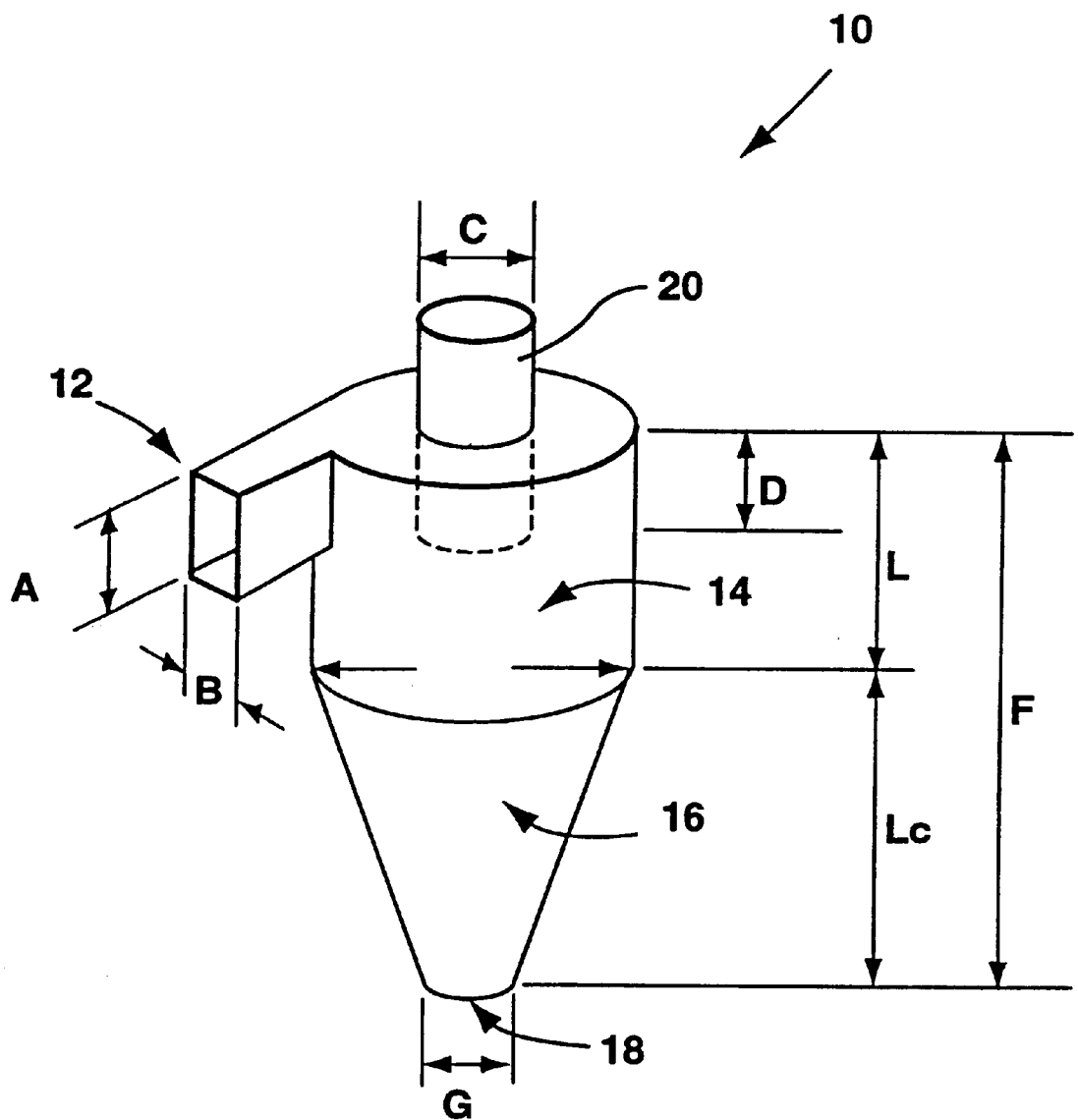
FIG. 1 is a cyclone separator as is known in the art.

FIGS. 12(a)–(h) are the perspective view and the respective top plan view of further alternate embodiments of the cyclone separator according to the instant invention wherein the cyclone cavity has a single insert of varying shape;

FIGS. 13(a)–(h) are the perspective view and the respective top plan view of further alternate embodiments of the cyclone separator according to the instant invention wherein the cyclone cavity has two similarly shaped inserts of varying shape, one being positioned above the other and rotated 90°;

FIGS. 14(a)–(h) are the perspective view and the respective top plan view of further alternate embodiments of the cyclone separator according to the instant invention wherein the cyclone cavity has two similarly shaped inserts of varying shape, one being positioned above the other and rotated at other than 90°;

FIGS. 15(a)–(h) are the perspective view and the respective top plan view of further alternate embodiments of the cyclone separator according to the instant invention wherein the cyclone cavity has two dissimilarly shaped inserts of varying shape, one being positioned above the other;

FIGS. 16(a)–(h) are the perspective view and the respective top plan view of further alternate embodiments of the cyclone separator according to the instant invention wherein the cyclone cavity has two dissimilarly shaped inserts of varying shape, one being positioned above the other and offset;

FIGS. 17(a)–(f) are the perspective view and the respective top plan view of further alternate embodiments of the cyclone separator according to the instant invention wherein the cyclone cavity has a single insert of varying shape and wherein the insert has recesses in the outer surface thereof;

FIGS. 18(a)–(f) are the perspective view and the respective top plan view of further alternate embodiments of the cyclone separator according to the instant invention wherein the cyclone cavity has two similarly shaped inserts of varying shape, one being positioned above the other and rotated 90° and wherein the inserts have recesses in the outer surface thereof;

FIGS. 19(a)–(f) are the perspective view and the respective top plan view of further alternate embodiments of the cyclone separator according to the instant invention wherein the cyclone cavity has a single insert of varying shape and wherein the insert has concave recesses in the outer surface thereof;

FIGS. 20(a)–(f) are the perspective view and the respective top plan view of further alternate embodiments of the cyclone separator according to the instant invention wherein the cyclone cavity has two similarly shaped inserts of varying shape, one being positioned above the other and rotated 90° and wherein the inserts have concave recesses in the outer surface thereof;

FIGS. 21(a)–(f) are the perspective view and the respective top plan view of further alternate embodiments of the cyclone separator according to the instant invention wherein the cyclone cavity has one or more helical inserts;

FIGS. 22(a)–(h) are the perspective view and the respective top plan view of further alternate embodiments of the cyclone separator according to the instant invention wherein the cyclone has a trumpet shape and the cyclone cavity has a single insert of varying shape;

FIGS. 23(a)–(h) are the perspective view and the respective top plan view of further alternate embodiments of the cyclone separator according to the instant invention wherein the cyclone has a trumpet shape and the cyclone cavity has two similarly shaped inserts of varying shape, one being positioned above the other and rotated 90°;

FIGS. 24(a)–(h) are the perspective view and the respective top plan view of further alternate embodiments of the cyclone separator according to the instant invention wherein the cyclone has a trumpet shape and the cyclone cavity has two similarly shaped inserts of varying shape, one being positioned above the other and rotated at other than 90°;

FIGS. 25(a)–(h) are the perspective view and the respective top plan view of further alternate embodiments of the cyclone separator according to the instant invention wherein the cyclone has a trumpet shape and the cyclone cavity has two dissimilarly shaped inserts of varying shape, one being positioned above the other;

FIGS. 26(a)–(h) are the perspective view and the respective top plan view of further alternate embodiments of the cyclone separator according to the instant invention wherein the cyclone has a trumpet shape and the cyclone cavity has two dissimilarly shaped inserts of varying shape, one being positioned above the other and offset;

FIGS. 27(a)–(f) are the perspective view and the respective top plan view of further alternate embodiments of the cyclone separator according to the instant invention wherein the cyclone has a trumpet shape and the cyclone cavity has a single insert of varying shape and wherein the insert has recesses in the outer surface thereof;

FIGS. 28(a)–(f) are the perspective view and the respective top plan view of further alternate embodiments of the cyclone separator according to the instant invention wherein the cyclone has a trumpet shape and the cyclone cavity has a single insert of varying shape and wherein the insert has recesses in the outer surface thereof which are positioned off centre;

FIGS. 29(a)–(f) are the perspective view and the respective top plan view of further alternate embodiments of the cyclone separator according to the instant invention wherein the cyclone has a trumpet shape and the cyclone cavity has two similarly shaped inserts of varying shape, one being positioned above the other and rotated 90° and wherein the inserts have recesses in the outer surface thereof;

FIGS. 30(a)–(f) are the perspective view and the respective top plan view of further alternate embodiments of the cyclone separator according to the instant invention wherein the cyclone has a trumpet shape and the cyclone cavity has a single insert of varying shape and wherein the insert has concave recesses in the outer surface thereof;

FIGS. 31(a)–(f) are the perspective view and the respective top plan view of further alternate embodiments of the cyclone separator according to the instant invention wherein the cyclone has a trumpet shape and the cyclone cavity has two similarly shaped inserts of varying shape, one being positioned above the other and rotated 90° and wherein the inserts have concave recesses in the outer surface thereof; and, FIGS. 32(a)–(f) are the perspective view and the respective top plan view of further alternate embodiments of the cyclone separator according to the instant invention wherein the cyclone cavity has a trumpet shape and the cyclone cavity has one or more helical inserts.

DESCRIPTION OF PREFERRED EMBODIMENT

As shown in FIGS. 2–10, cyclone separator 30 may comprises a longitudinally extending body having a top end 32, a bottom end 34, fluid inlet port 36, a fluid outlet port 38 and a separated material outlet 40.

Figure 11:
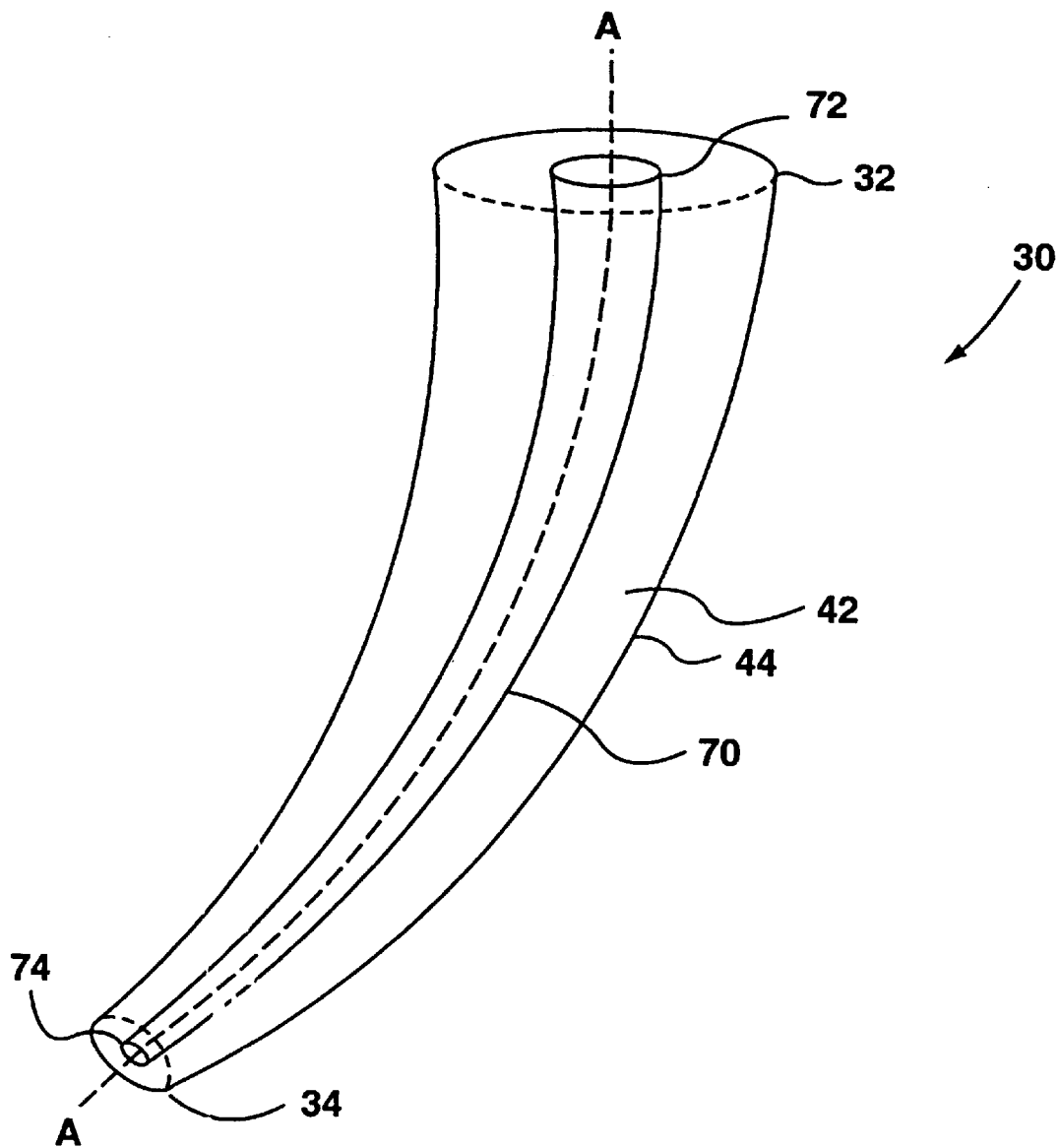

Cyclone separator 30 has a wall 44 having an inner surface 46 and defining a cavity 42 therein within which the fluid rotates. Cyclone separator 30 has a longitudinally extending axis A A which extends centrally through separator 30. Axis A—A may extend in a straight line as shown in FIG. 2 or it may be curved or serpentine as shown in FIG. 11.

As shown in FIGS. 2, 4, 5, 7, 8, 9 and 10, cyclone separator 30 is vertically disposed with the fluid and material to be separated entering cyclone separator 30 at a position adjacent top end 32. As shown in FIG. 6, cyclone separator 30 is again vertically disposed but inverted compared to the position show in FIGS. 2, 4, 5, 7, 8, 9 and 10. In this embodiment, fluid 48 enters cyclone separator 30 at a position adjacent bottom end 34 of the separator. It will be appreciated by those skilled in the art that provided the inlet velocity of fluid 48 is sufficient, axis A—A may be in any particular plane or orientation, such as being horizontally disposed or inclined at an angle.

Fluid 48 may comprise any fluid that has material contained therein that is capable of being removed in a cyclone separator. Fluid 48 may be a gas or a liquid. If fluid 48 is a gas, then fluid 48 may have solid particles and/or liquid particles and/or a second gas contained therein such as by being suspended, mixed or entrained therein. Alternately, if fluid 48 is a liquid, it may have solid particles and/or a second liquid and/or a gas contained therein such as by being suspended, mixed or entrained therein. It will thus be appreciated that the cyclone separator of the instant invention has numerous applications. For example, if fluid 48 is a gas and has solid particles suspended therein, then the cyclone separator may be used as the filter media in a vacuum cleaner. It may also be used as a scrubber for a smoke stack so as to remove suspended particulate matter such as fly ash therefrom. It may also be used as pollution control equipment, such as for a car, or to remove particles from an inlet gas stream which is fed to turbo machinery such as a turbine engine.

If fluid 48 is a gas and contains a liquid, then cyclone separator 30 may be used as a mist separator.

If fluid 48 is a mixture of two or more liquids, then cyclone separator 30 may be used for liquid/liquid separation. If fluid 48 is a liquid and has a gas contained therein, then cyclone separator 30 may be used for gas/liquid separation. If fluid 48 is a liquid which has solid particles contained therein, then cyclone separator 30 may be used for drinking water or waste water purification.

In the preferred embodiment shown in FIG. 2, wall 44, in transverse section, is in the shape of an ellipse. In the preferred embodiment shown in FIG. 4, wall 44 has a trumpet shape. Such shapes may be prepared by sweeping a continuous n-differentiable curve 360° around axis A—A wherein n is $\geq 2$ and the second derivative is not zero everywhere. Preferably, n is $\geq 2$ and $\leq 1,000$, more preferably $n \leq 100$ and most preferably $n \leq 10$. If the second derivative is zero at a finite number of points, then it may be zero from about 2 to 100 points, preferably from about 2 to about 30 points and, more preferably, at 2 to 10 points.

Fluid 48 enters cyclone separator through inlet port 36 and tangentially enters cavity 42. Due to the tangential entry of fluid 48 into cavity 42, fluid 48 is directed to flow in a cyclonic pattern in cavity 42 in the direction of arrows 50. Fluid 48 travels in the axial direction in cavity 42 from fluid entry port 36 to a position adjacent bottom end 34. At one point, the fluid reverses direction and flows upwardly in the direction of arrows 52 while material 54 becomes separated from fluid 48 and falls downwardly in the direction of arrows 56. Treated fluid 58, which has material 54 separated therefrom, exits cyclone separator 30 via outlet port 38 at the top end 32 of cavity 42.

Figure 7:
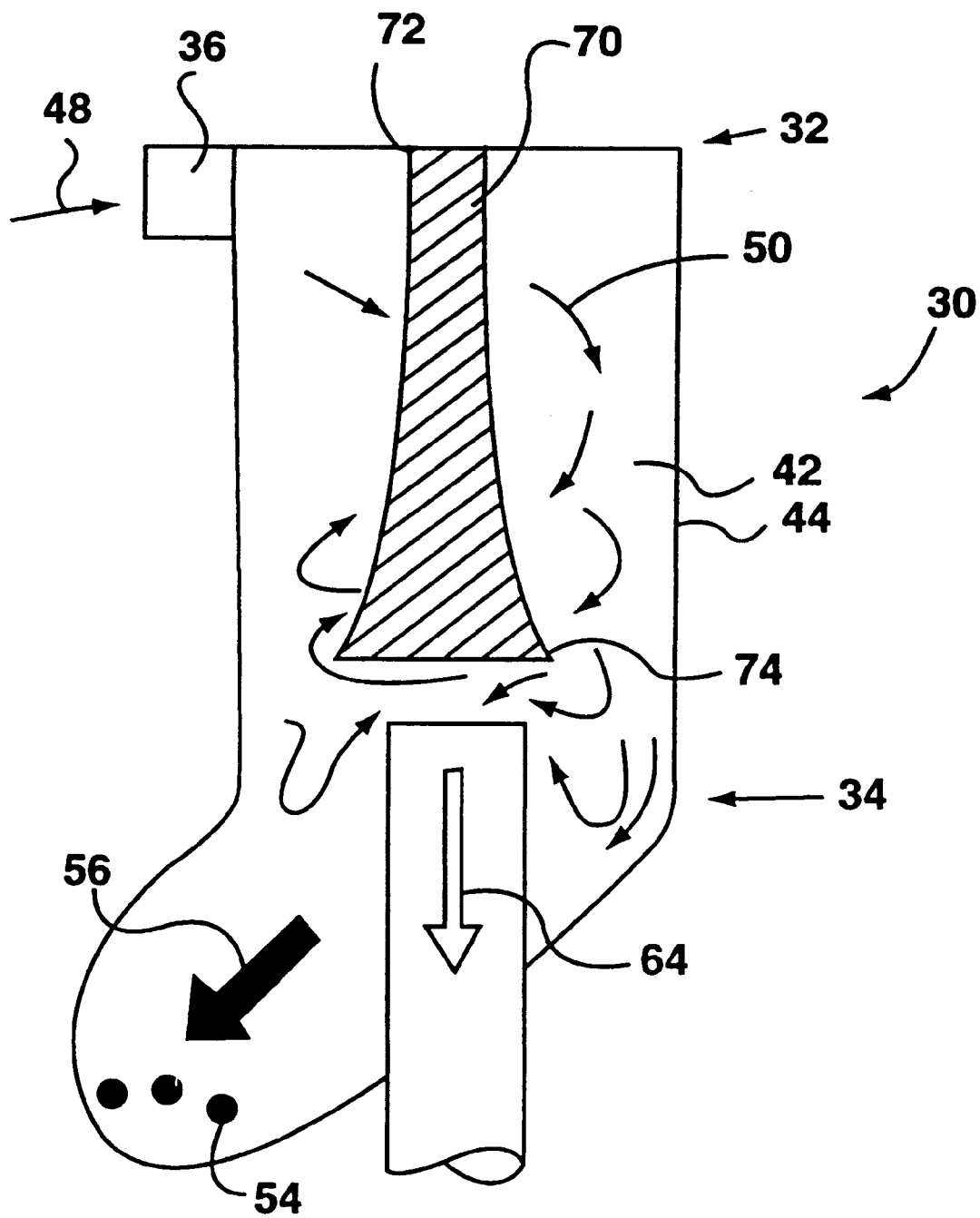
Figure 8:
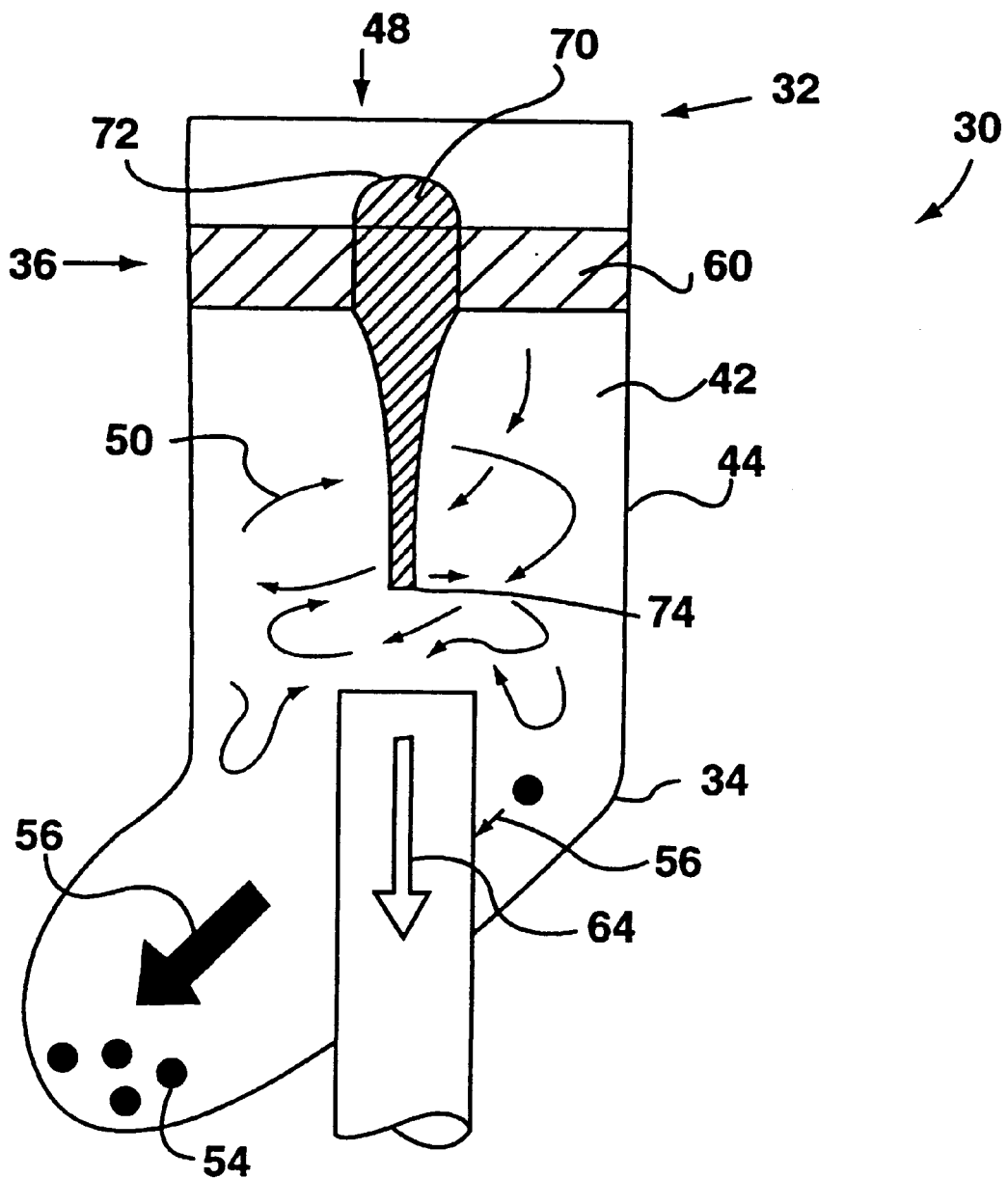

In the alternate embodiment shown in FIGS. 7 and 8, cyclone separator 30 may be a unidirectional flow cyclone separator. The cyclone separator operates in the same manner as described above with respect to the cyclone separator 30 shown in FIG. 2 except that fluid 48 travels continuously longitudinally through cavity 42. Material 54 becomes separated from fluid 48 and travels downwardly in the direction of arrows 56. Treated fluid 64, which has material 54 separated therefrom, continues to travel downwardly and exits cyclone separator 30 via outlet port 38 at a position below bottom end 34 of cavity 42.

As exemplified in the FIGS. 2–10, cyclone separator may have a variety of shapes. In particular, cyclone separator may have an outer rotational wall 44 which is of any shape known in the industry. For example, outer wall 44 may be either cylindrical (see for example FIGS. 12(a)–(h)) or frusto-conical in shape.

In one preferred embodiment, cavity 42 has an inner portion in which fluid rotates as it travel longitudinally in cyclone separator 30 and an outer portion exterior thereto but contiguous therewith. The outer portion of cavity 42 may extend outwardly from the inner portion of the cavity to define a zone in which at least a portion of fluid 48 expands outwardly as it rotates in a plane defined by the transverse section whereby the portion of the fluid in the outer portion of cavity 42 has different fluid flow characteristics compared to those of fluid 48 rotating in the inner portion of cavity 42 which promote the separation of the material from the fluid. Such a configuration for wall 44 of cavity 42 is disclosed in co-pending application number 09/136,367 entitled CYCLONE SEPARATOR HAVING A VARIABLE TRANSVERSE PROFILE filed concurrently herewith, all of which is incorporated herein by reference.

Alternately, outer wall 44 of cavity 42 may be in the shape of a continuous n-differentiable curve wherein n is >2 and the second differential is not zero everywhere, swept 360° around the longitudinal axis of cavity 42 (see for example FIGS. 22(a)–(h)).

Figure 5:
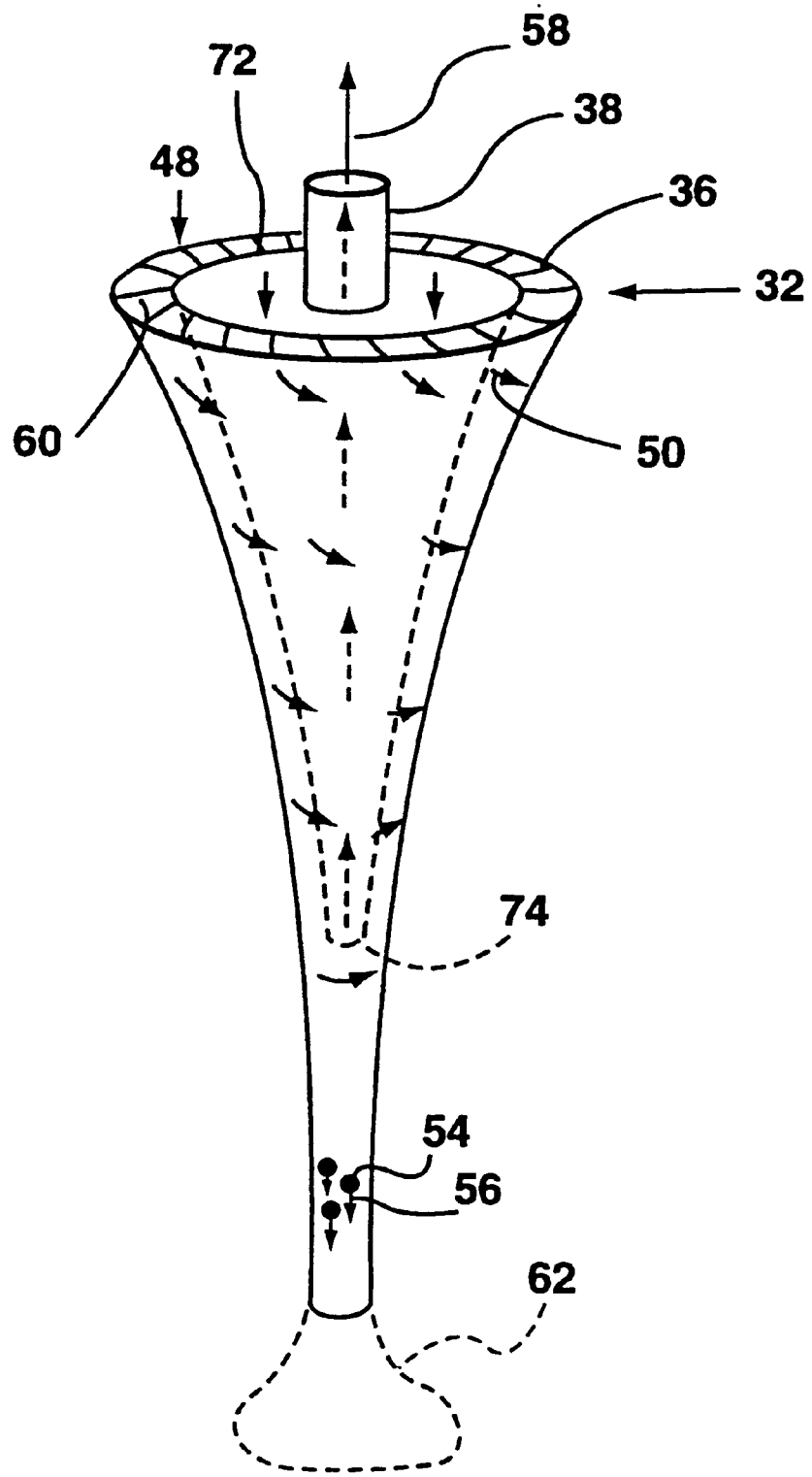
Figure 6:
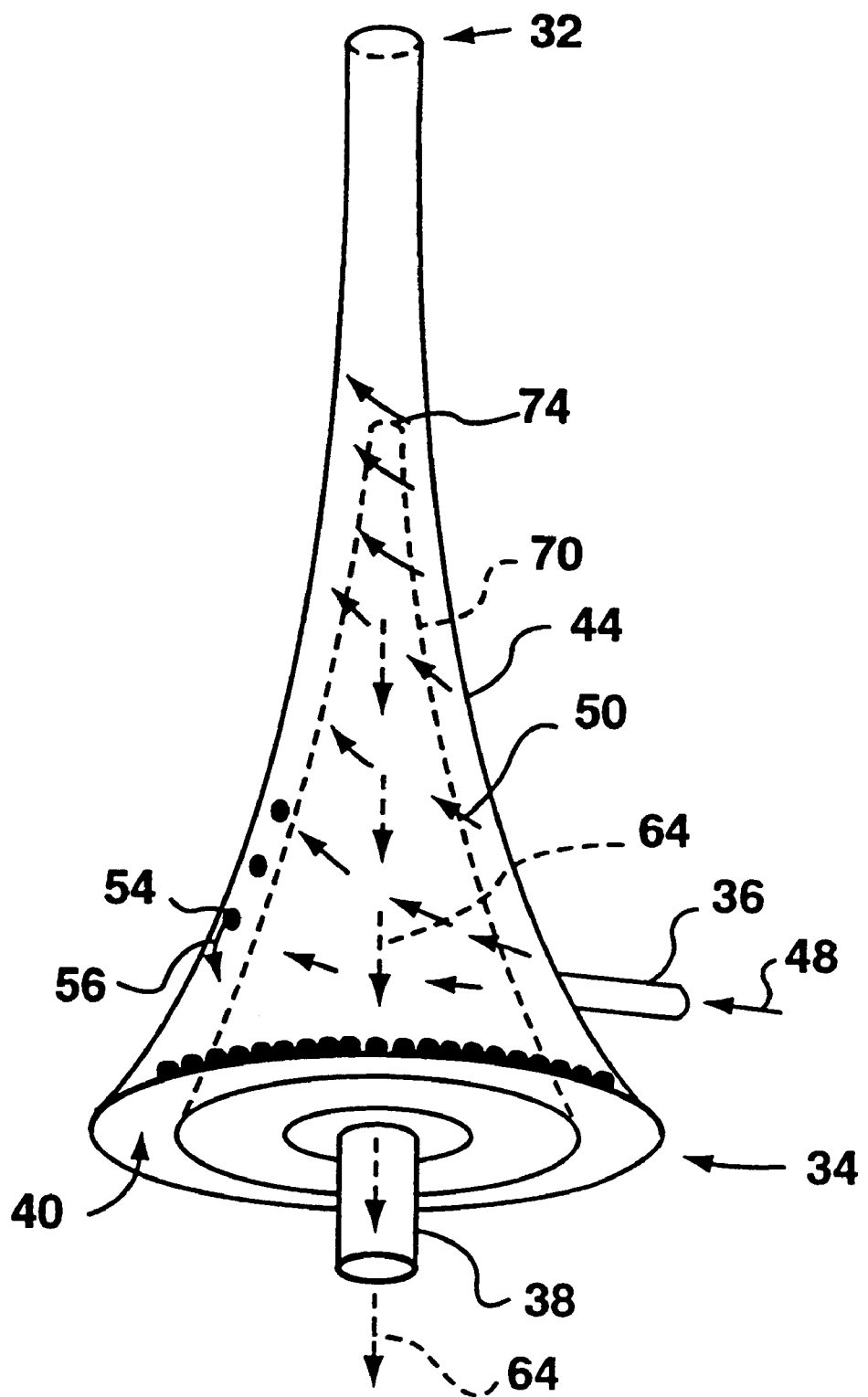
Figure 10:
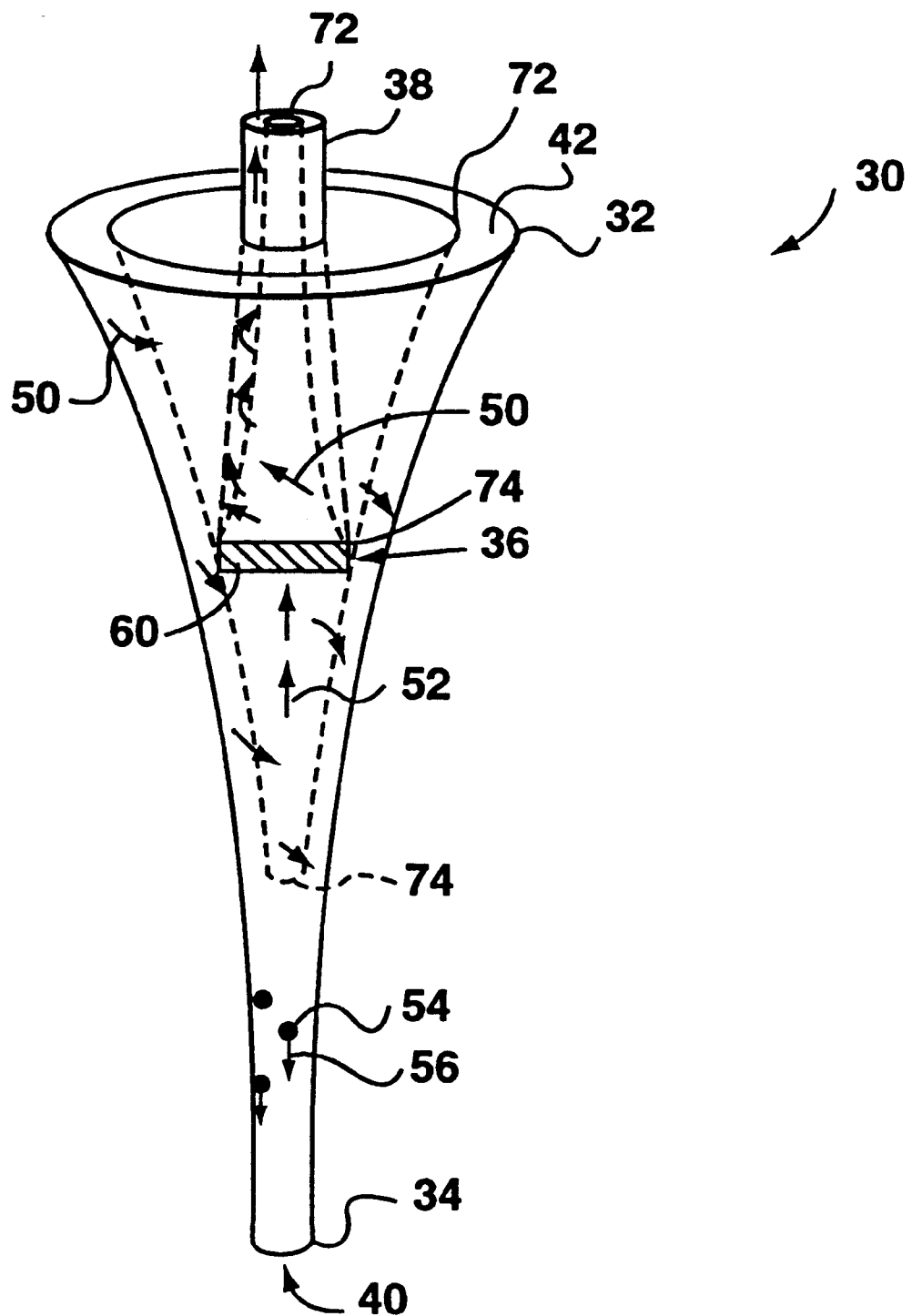

As shown in FIGS. 5, 8 and 10, fluid 48 may enter cavity 42 axially. In such a case, fluid entry port 36 is provided, for example, at top end 32 of cyclone separator 30. A plurality of vanes 60 are provided to cause fluid 48 to flow or commence rotation within cavity 42. It would be appreciated by those skilled in the art that fluid 48 may enter cavity 48 from any particular angle provided that fluid entry port 36 directs fluid 48 to commence rotating within cavity 42 so as to assist in initiating or to fully initiate, the cyclonic/swirling motion of fluid 48 within cavity 42.

Referring to FIG. 6, cyclone separator 30 is vertically disposed with fluid entry port 36 positioned adjacent bottom end 34. As fluid 48 enters cavity 42, it rises upwardly and is subjected to a continuously varying acceleration along inner surface 46 of cavity 42. Gravity will tend to maintain the contained material (if it is heavier) in the acceleration region longer thereby enhancing the collection efficiency. At one point, the air reverses direction and flows downwardly in the direction of arrow 64 through exit port 38. Particles 54 become separated and fall downwardly to bottom end 34 of cyclone separator 30. If bottom end 34 is a contiguous surface, then the particles will accumulate in the bottom of cyclone separator 30. Alternately, opening 40 may be provided in the bottom surface of cyclone separator 30 so as to permit particles 54 to exit cyclone separator 30.

Figure 4:
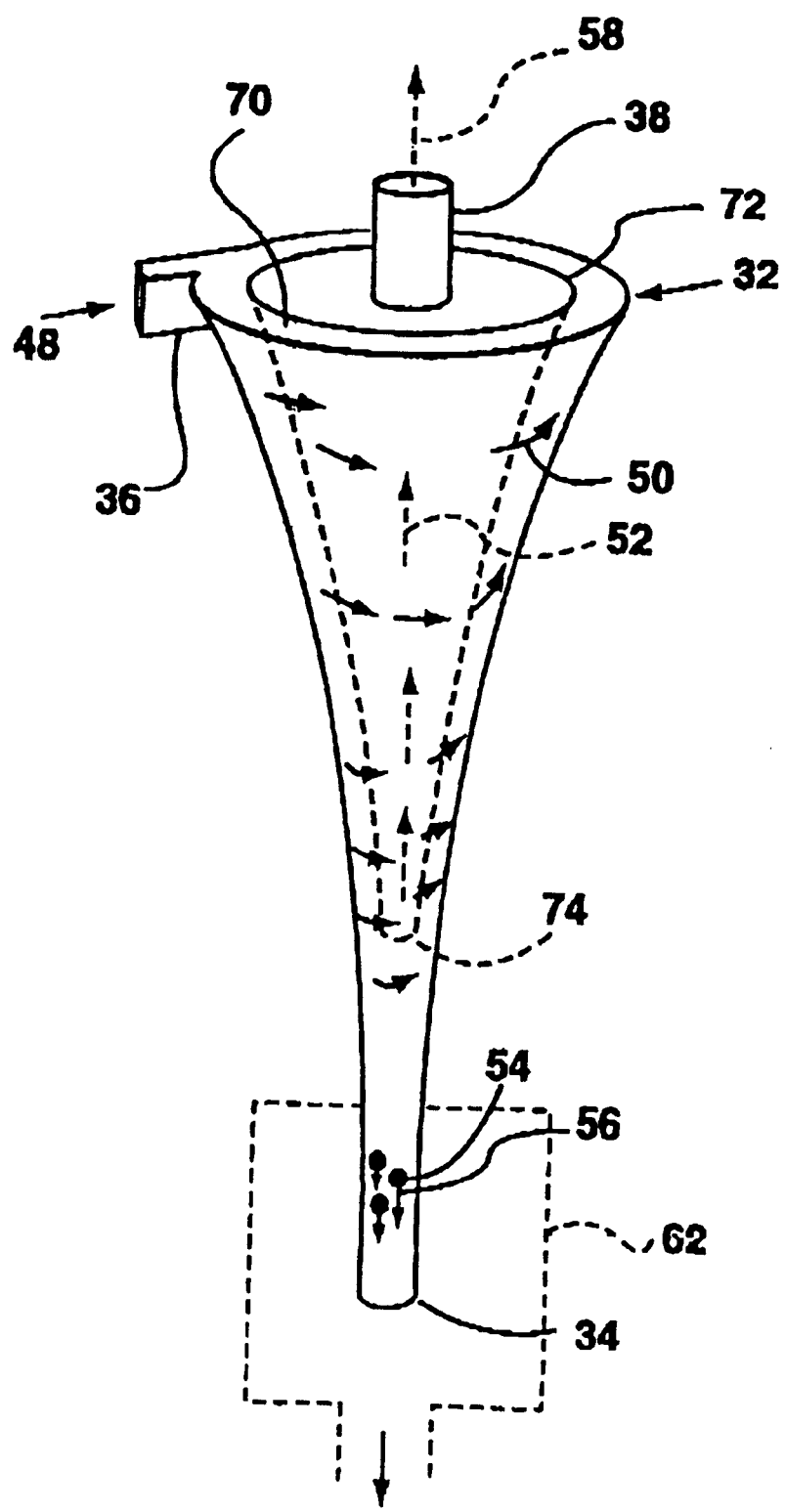
FIGS. 4–11 are each alternate embodiments of the cyclone separator of FIG. 2.

It will also be appreciated that cyclone separator 30 may have a portion thereof which is designed to accumulate separated material (for example, if the bottom surface of the cyclone separator FIG. 6 were sealed) or, if the bottom of cyclone separator 30 of FIG. 5 had a collection chamber 62 (which is shown in dotted outline) extend downwardly from outlet 40. Alternately, outlet 40 may be in fluid communication with a collection chamber 62. For example, as shown in FIG. 4, collection chamber 62 is positioned at the bottom of and surrounds outlet 40 so as to be in fluid communication with cyclone separator 30. Collection chamber 62 may be of any particular configuration to store separated material (see FIGS. 7 and 8) and/or to provide a passage by which separated material 54 is transported from cyclone separator downstream (see FIG. 4) provided it does not interfere with the rotational flow of fluid 48 in cavity 42.

According to the instant invention, an insert 70 is positioned within cavity 42. Insert 70 has an upstream end 72, a downstream end 74 and a wall 76 extending between upstream end 72 and downstream end 74. Wall 76 has an outer surface 78. In one embodiment, insert 70 may be hollow and have an inner cavity 80. This particular configuration is advantageous if cyclone separator 30 is a reverse flow separator as shown in FIG. 2 whereby fluid 48, after material 54 has been separated therefrom, travels upwardly through cavity 80 of insert 70 to fluid outlet port 38. It will be appreciated that if cyclone separator 30 is a unidirectional flow separator as shown in FIGS. 7 and 8, that insert 70 may be a closed or a solid member.

Insert 70 is a distinct member positioned within cavity 42 to imping upon at least a portion fluid 48 as it rotates within cavity 42 thereby changing the speed, the direction of travel or the velocity of the fluid and causing some of the material contained in fluid 48 to be separated from fluid 48. It will be appreciated that insert 70 does not imping upon fluid 48 to a degree whereby the cyclonic motion of fluid 48 in cavity 42 is prevented. Instead, insert 70 impinges to a sufficient degree to cause at least some of the contained material to be separated from fluid 48 while still permitting fluid 48 to maintain sufficient momentum to continue its rotational motion within cavity 42.

When fluid 48 rotates in a cyclonic pattern within cavity 42, it will rotate only in the outer portion of cavity 42. The inner portion of cavity 42 will comprise a low pressure area where fluid 48 is stagnant or, in the case of a reverse flow cyclone, fluid 48 is travelling upwardly through the dead air space 75 in the centre of cavity 42. Insert 70 may be mounted (e.g. from above or from below cyclone separator 30) within this inner portion and extend radially outwardly from the inner portion so as to interact with at least a portion of fluid 48 as it rotates in the outer portion of cavity 42 to impart to the portion of the fluid with which it interacts different fluid flow characteristics compared to those of fluid 48 rotating in the outer portion of cavity 42 which promote the separation of the material from the fluid. For example, insert 70 may interact with fluid 48 to impart to at least a portion of fluid 48 a different speed, a different direction of travel or a different velocity compared to that of fluid 48 rotating in the outer portion of cavity 42.

Preferably, outer wall 76 of inset 70 is spaced from inner surface 46 and is configured to impart changes, and more preferably to impart continuous changes, in the rate of acceleration to at least a portion of fluid 48 as it rotates within cavity 42 causing some of the material to be separated from fluid 48.

In order to allow cyclone separator 30 to achieve a good separation efficiency over a wider range of small particle sizes, wall 76 is configured to impart changes in one or more of the speed, direction of travel, velocity and the rate of acceleration of fluid 48 as it rotates within cavity 42. By allowing fluid 48 to be subjected to such varying fluid flow characteristics, different size particles may be separated from fluid 48 at different portions along the path of travel of fluid 48 in cavity 42.

In one embodiment, insert 70 may be configured to impart changes to the rate of acceleration of fluid 48 as it travels longitudinally through cavity 42. Alternately, or in addition, insert 70 may be configured to impart changes in the rate of acceleration of fluid 48 as it travels transversely around wall 44.

For example, if the rate of acceleration continually increases along the length of cyclone separator 30, as would be the case of FIG. 4, continuously finer particles would be separated as the fluid proceeds from the top end 32 to bottom end 34. A boundary or prendtl layer which exists along inner surface 46 of wall 44 and outer surface 78 of wall 76 provides low flow or low velocity zones within which the separated material may settle and not become re-entrained by the faster moving air rotating within cavity 42. As fluid 48 travels downwardly through the cyclone separator shown in FIG. 4, the contained material, which for example may have a higher density then that of the fluid, would be subjected to continuously increasing acceleration and would be separated from the fluid and travel downwardly along inner surface 46 of wall 44 and outer surface 78 of wall 76 in the boundary or prendtl layer. As the fluid travels further downwardly through cyclone separator 30, the fluid would be accelerated still more. Thus, at an intermediate level of cyclone separator 30 of FIG. 4, fluid 48 would be travelling at an even greater rate of speed compared to the top end 32 resulting in even finer contained material becoming separated. This effect would continue as fluid 48 rotates around inner surface 46 to bottom end 34.

In another embodiment, the acceleration may continually decrease throughout the length of cyclone separator 30. In another embodiment, the acceleration may vary between continuously increasing and continuously decreasing along the length of cyclone separator 30.

In the preferred embodiment shown in FIG. 2, fluid 48 is subjected to changes in its rate of acceleration as it travels transversely around wall 44. As shown in FIG. 2, cavity 42 and insert 42 are elliptical in transverse section and have a major axis a—a and a minor axis b—b. The portion of maximum curvature of inner surface 46 and outer surface 78 in the transverse plane is denoted by $C_{max}$ and the portion of minimum curvature of inner surface 46 and outer surface 78 in the transverse plane is denoted by $C_{min}$. By allowing fluid 48 to be subjected to varying acceleration as it rotates in the transverse plane, different size particles may be separated from fluid 48 at different portions along the circumference of cyclone separator 30. For example, the acceleration of fluid 48 would increase along sector $C_{max}$ of cyclone separator 30 and particles having a different density would be separated at this portion of the circumference. Similarly, for example, the acceleration of fluid 48 would decrease along sector $C_{min}$ of cyclone separator 30 and particles having a different density would be separated at this portion of the circumference. A boundary or prandtl layer which exists along inner surface 46 of wall 44 and outer surface 78 of wall 76 provides a low flow or a low velocity zone within which the separated material may settle and not become re-entrained by the faster moving air rotating within cavity 42.

Increasing the diameter of insert 70 decelerates the fluid. The contained material, which has a different density to the fluid would therefore change velocity at a different rate then the fluid. For example, if the contained material comprised particles which had a higher density, they would decelerate at a slower rate then fluid 48 and would therefore become separated from fluid 48. As the space between inner surface 46 and outer surface 78 widens, fluid 48 would accelerate. Once again, the denser particles would be slower to change speed and would be travelling at a slower rate of speed than fluid 48 as fluid 48 enters the wider portion of cavity 42 thus again separating the solid particles from fluid 48. It would be appreciated that if the particles where less dense then fluid 48, they would also be separated by this configuration of insert 70.

If fluid 48 comprises a mixture of two fluids which are to be separated, it is particularly advantageous to include in insert 70 at least one portion which is configured to decrease the rate of acceleration of fluid 48 as it passes through that portion of the separator. In this configuration, the less dense fluid would decrease its velocity to follow the contours of outer surface 78 more rapidly then the denser fluid (which would have a higher density), thus assisting in separating the less dense fluid from the more dense fluid.

In one preferred embodiment, at least a portion of inner surface 46 and a portion of outer surface 78 are the same and, more preferably, inner surface 46 and outer surface 78 are of a similar shape, but spaced apart, for the entire length of insert 70 (see FIGS. 2–6). Preferably, any point on outer surface 78 is at least 0.1 inches from inner surface 46 and, most preferably, inner surface 46 and outer surface 78 are spaced at least 0.125 inches apart.

Figure 9:
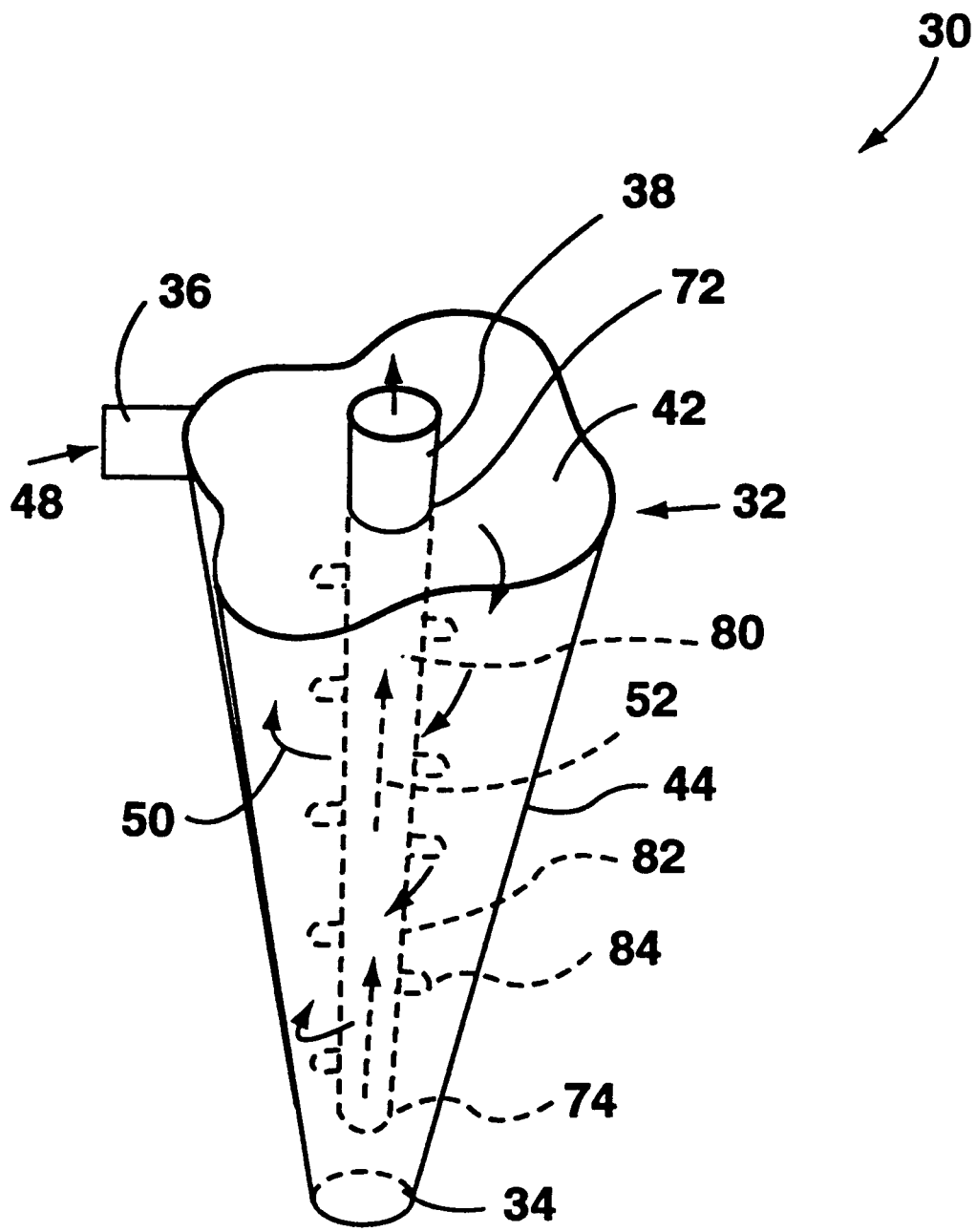

Insert 70 may be of several different configurations. As shown in the drawings. Insert 70 may be in the form, in transverse section, of a continuous closed convex path such as elliptical (see FIG. 2) or circular (see FIGS. 12(e) and (f)), a flat rectangular member (see FIGS. 12(a) and (b)), a polygon such as a triangle (see FIGS. 12(c) and (d)) a square (see FIGS. 12(g) and (h)) or a polygon having a larger number of sides, or a helix (see FIGS. 21(a)–(e)). If insert 70 is a helix, then, as shown in FIG. 9, insert 70 may have a central core 82 which defines a longitudinally extending channel (or cavity 80) within cavity 42. Helical vane 84 is provided on the exterior surface of central core 82. If cyclone separator 30 is a unidirectional flow separator, it will be appreciated that central core 82 need not be hollow. Further, upstream end 72 of helical vane 84 may be affixed at a position above cavity 42. Similarly, downstream end 74 of helical vane 84 may be secured in position at a point below cavity 42 thereby not requiring a central core 82.

Alternately, insert 70 may be in the shape of a continuous n-differentiable curve swept 360° around axis A—A wherein n is $\geq 2$ and the second derivative is not zero everywhere. Preferably, n is $\geq 2$ and $\leq 1000$, more preferably n is $\leq 100$ and most preferably, n is $\leq 10$. If the second derivative is zero at a finite number of points, then it may be zero from about 2 to 100 points, preferably from about 2 to about 30 points and, more preferably, at 2 to 10 points. For example, as shown in FIG. 4, the shape of insert 70 is characterized as a trumpet shape.

The exact position and shape of insert 70 will vary depending upon several factors including the transverse thickness of the cyclonic flow of fluid 48 which is created in cavity 42 and the shape of wall 44.

It will be appreciated that in one embodiment, insert 70 comprises an outer surface 78 all of which is configured to continuously impart momentum or directional changes on the fluid as it rotates within cavity 42. Alternately, only a portion of outer surface 78 of insert 70 may be so configured. The interaction with fluid 48 may impart changes in the speed, direction of travel or rate of acceleration of fluid 48 as it rotates in cavity 42 in addition to those imparted by wall 44 thus promoting the separation of contained material. The interaction may also spawn one or more second cyclones 77 which separate the contained material in the same manner as the main cyclone and/or one or more dead air spaces 75 (low velocity zones) in which the separated material may travel to a collecting chamber 62 without undue re-entrainment.

Figure 12B:
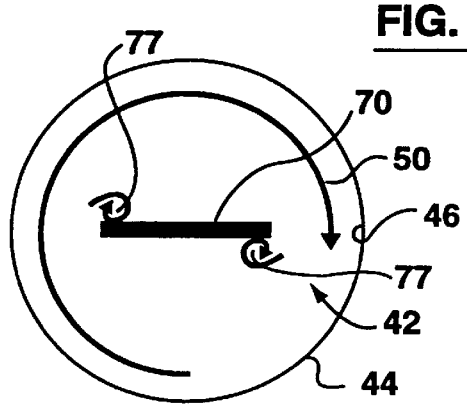
Figure 12A:
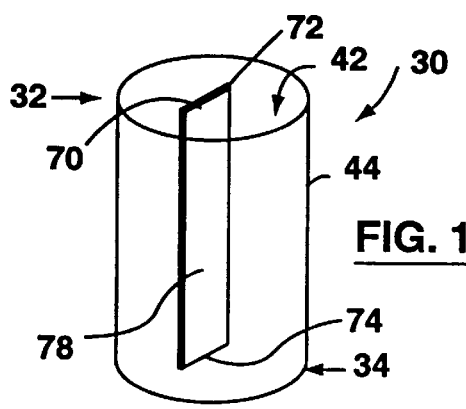
Figure 12D:
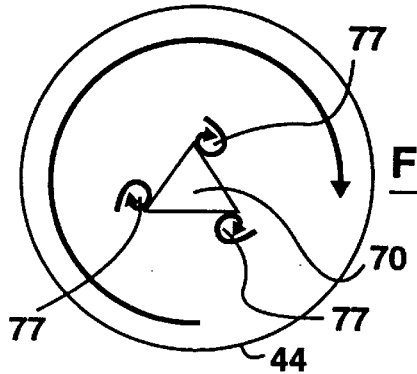
Figure 12C:
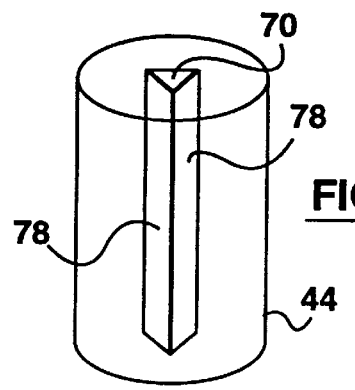
Figure 12F:
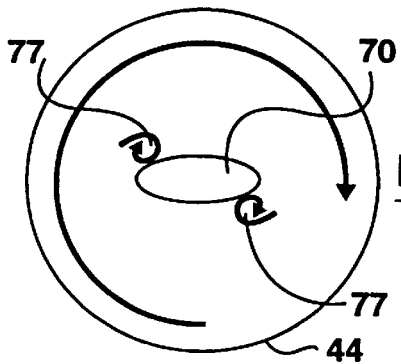
Figure 12E:
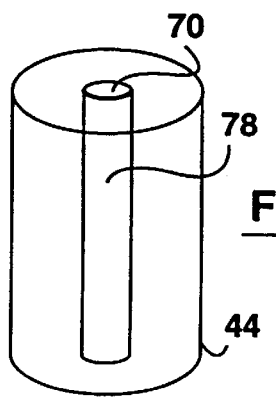
Figure 12H:
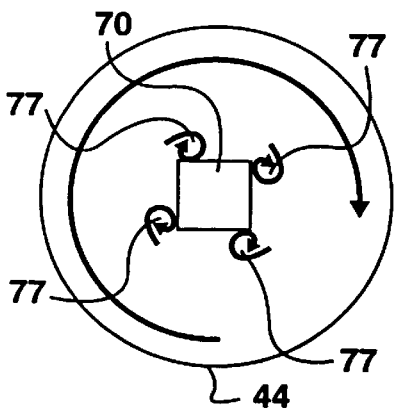
Figure 12G:
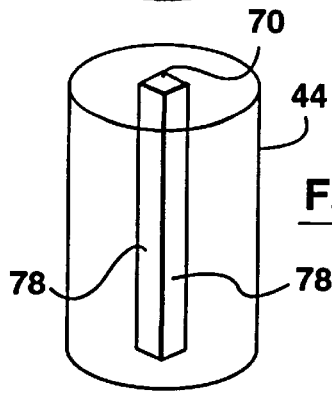
Figure 13B:
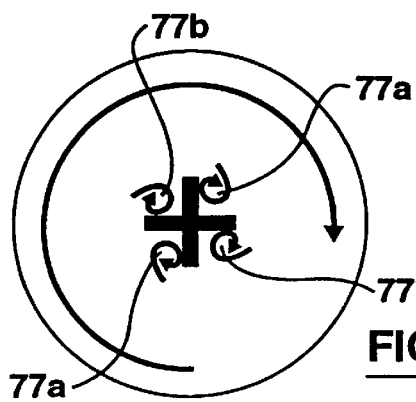
Figure 13A:
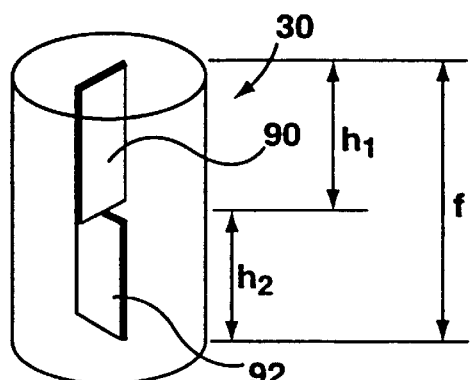
Figure 13D:
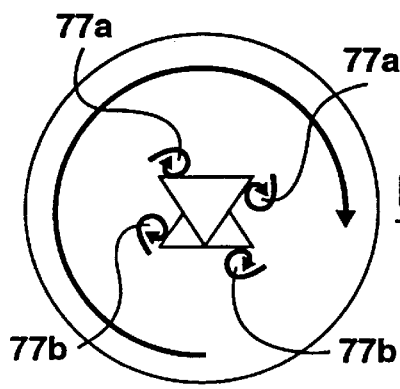
Figure 13C:
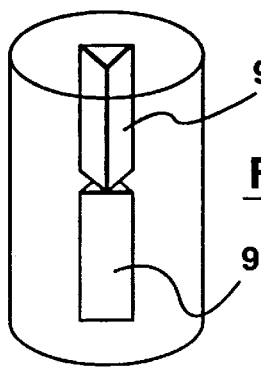
Figure 13F:
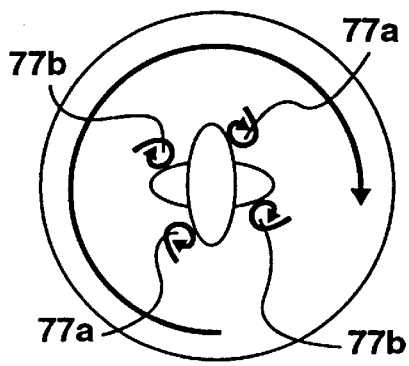
Figure 13E:
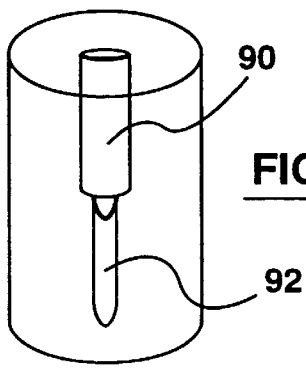
Figure 13H:
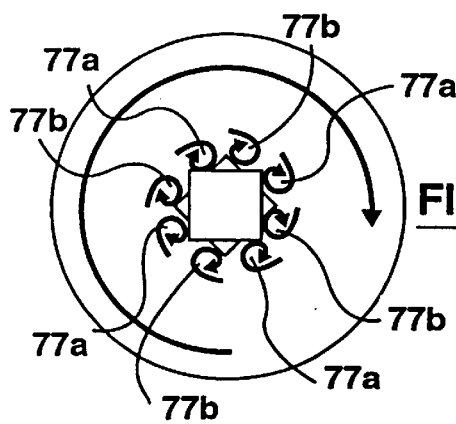
Figure 13G:
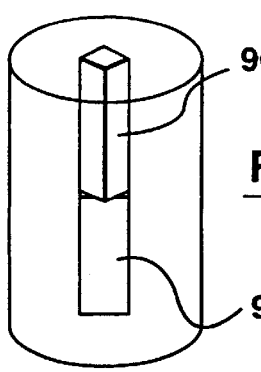
Figure 14A:
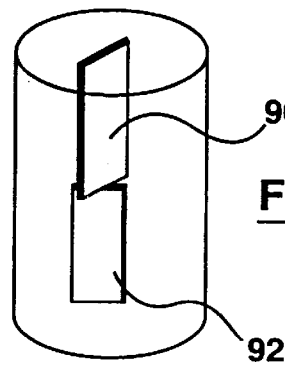
Figure 14B:
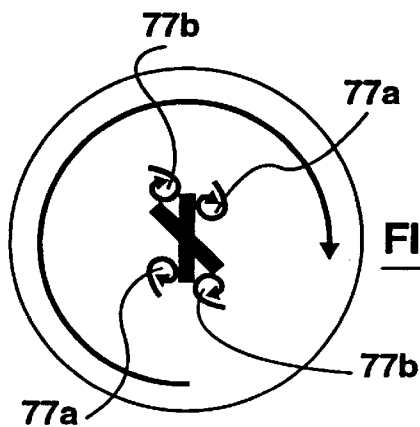
Figure 14C:
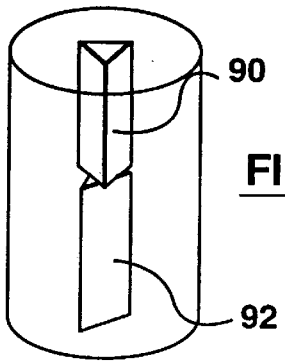
Figure 14D:
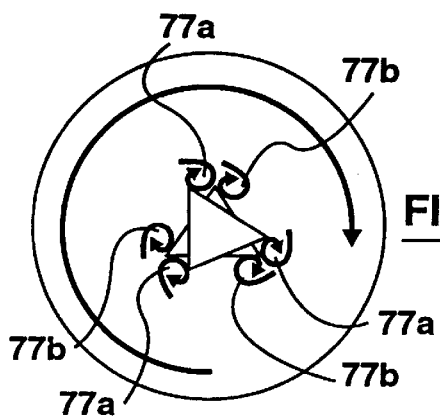
Figure 14:
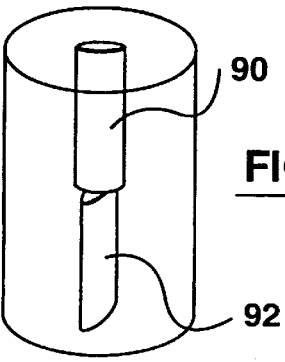
Figure 14F:
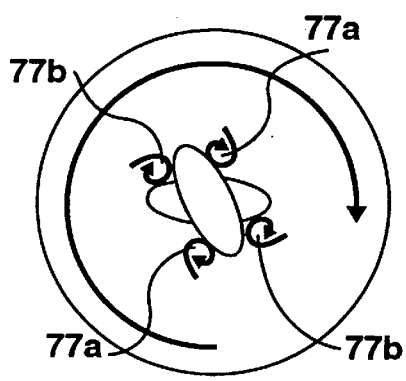
Figure 14G:
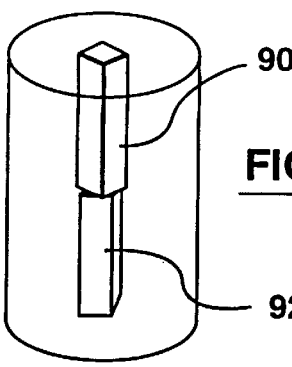
Figure 14H:
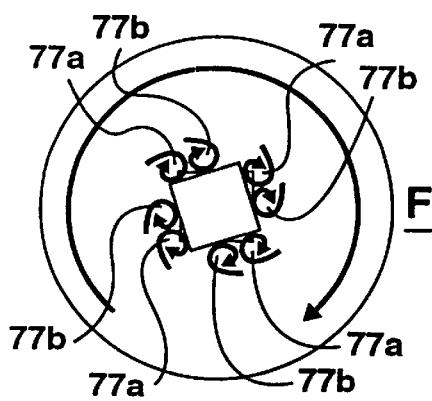
Figure 15B:
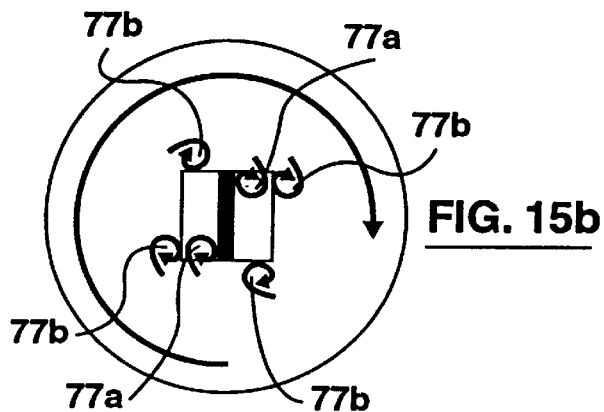
Figure 15A:
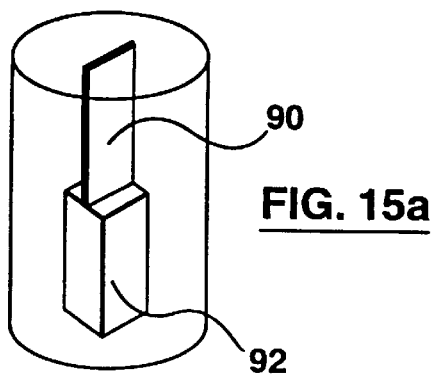
Figure 15D:
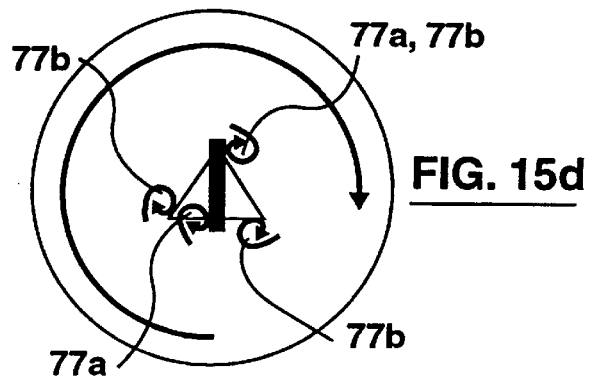
Figure 15C:
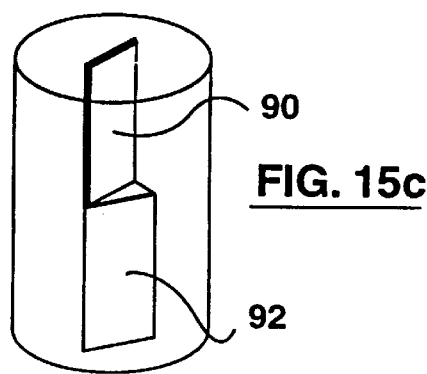
Figure 15F:
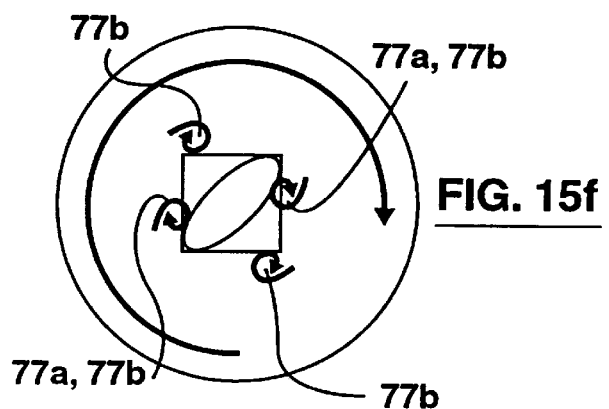
Figure 15E:
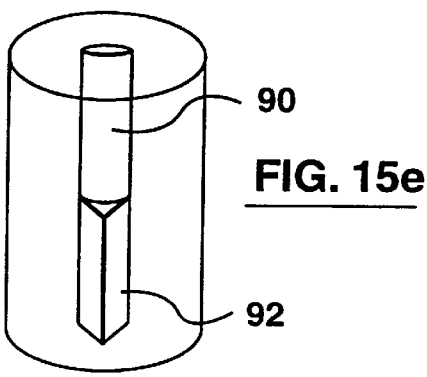
Figure 15H:
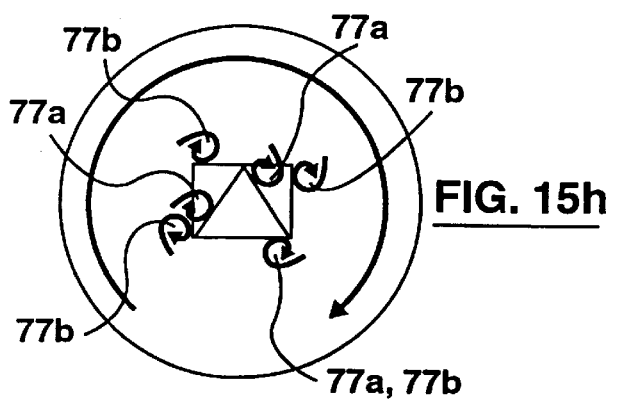
Figure 15G:
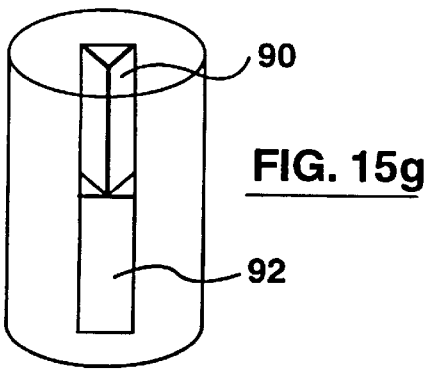
Figure 16A:
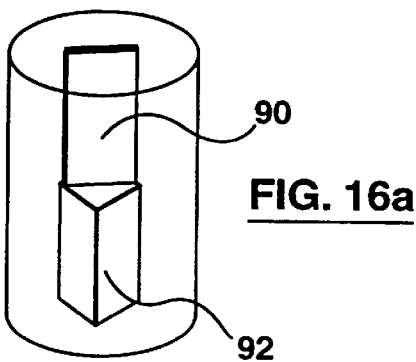
Figure 16B:
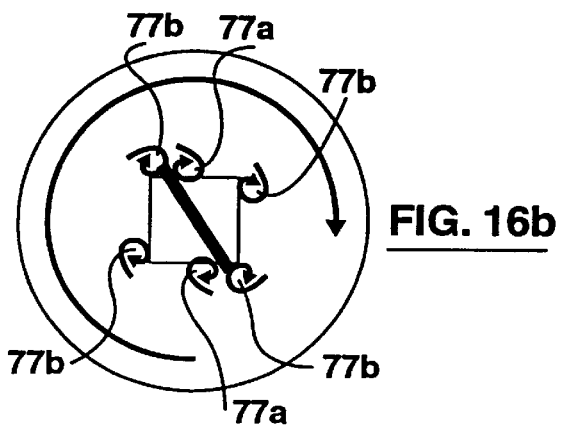
Figure 16C:
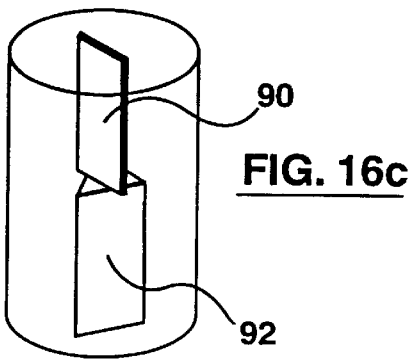
Figure 16D:
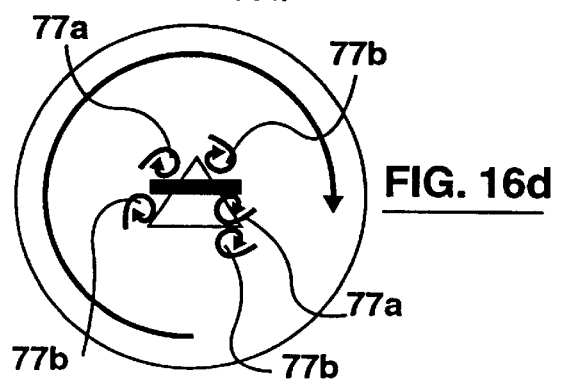
Figure 16E:
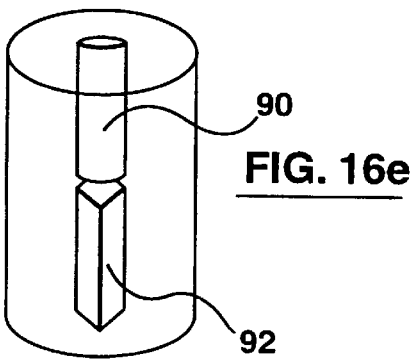
Figure 16F:
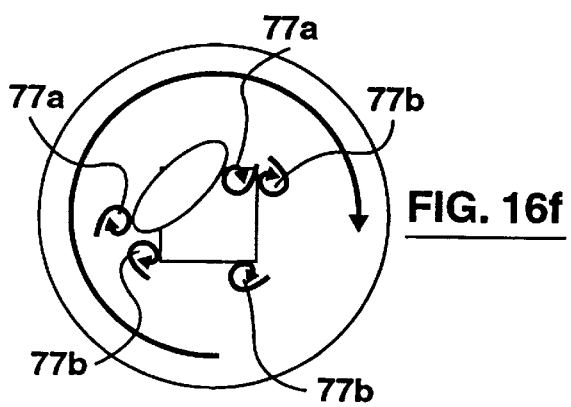
Figure 16G:
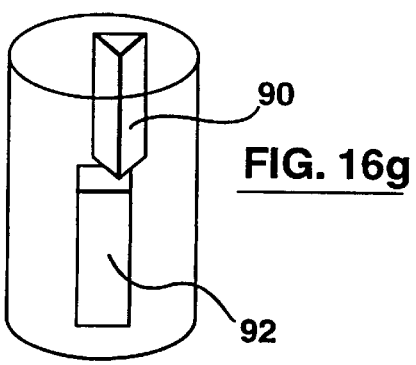
Figure 16H:
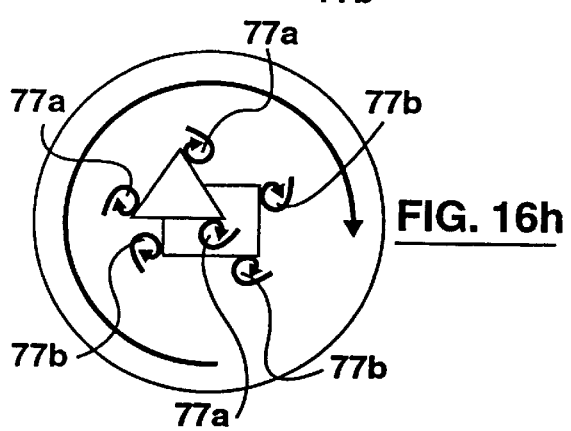
Figure 17B:
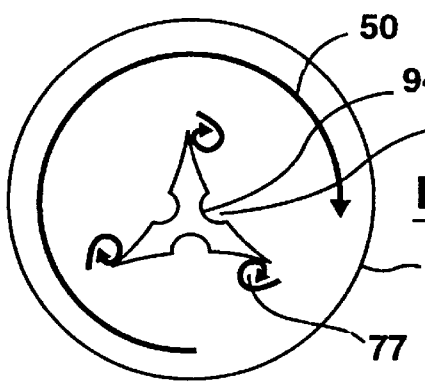
Figure 17A:
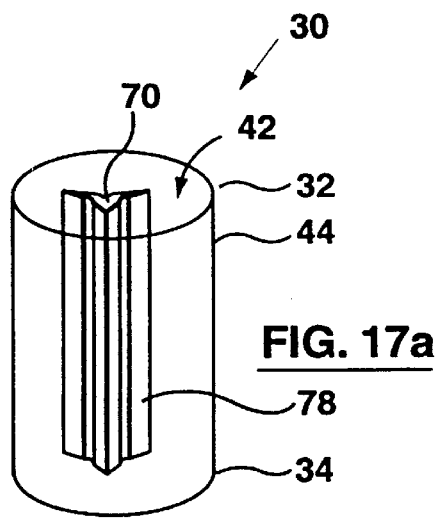
Figure 17D:
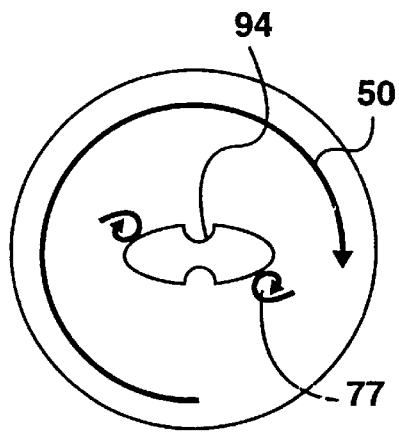
Figure 17C:
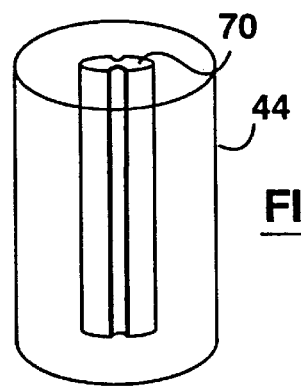
Figure 17F:
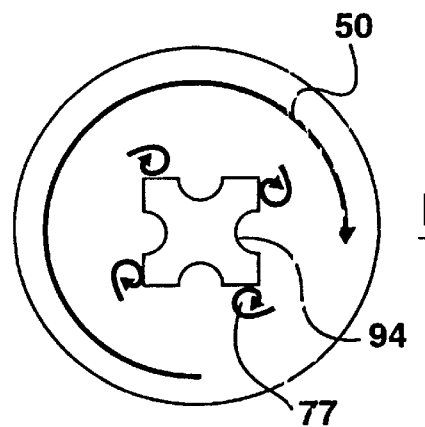
Figure 17E:
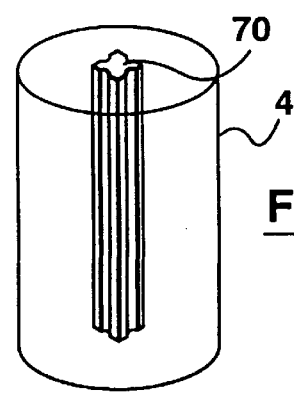
Figure 18B:
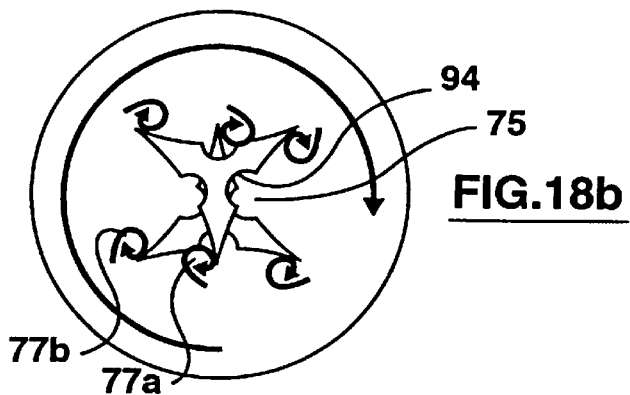
Figure 18A:
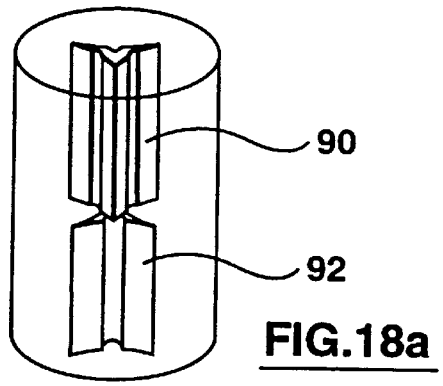
Figure 18D:
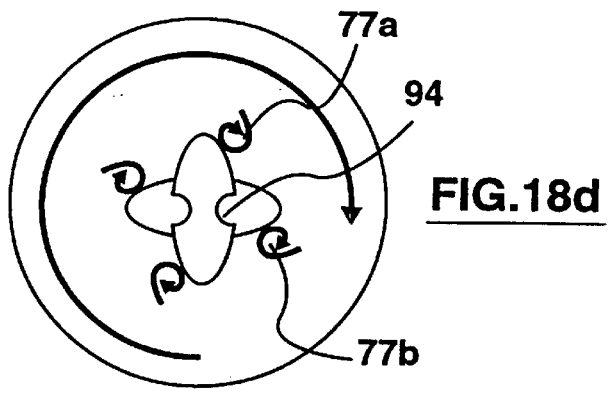
Figure 18C:
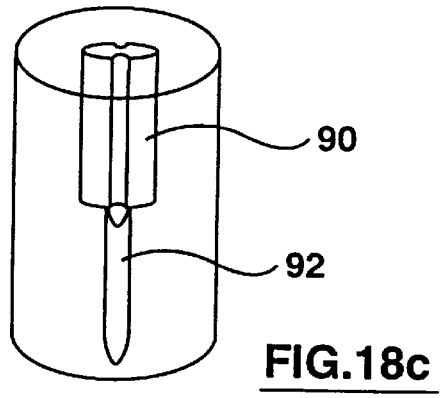
Figure 18F:
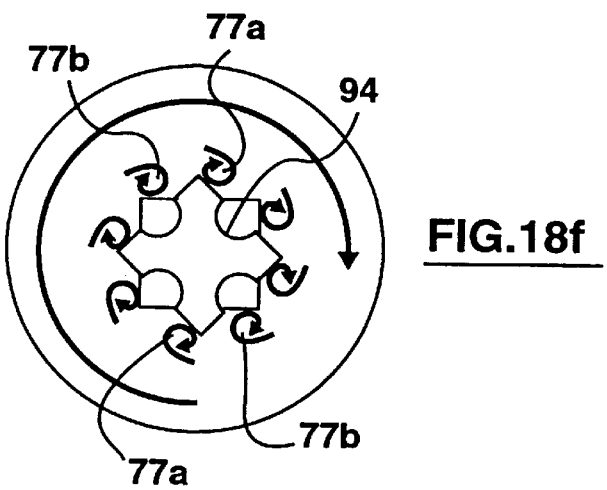
Figure 18E:
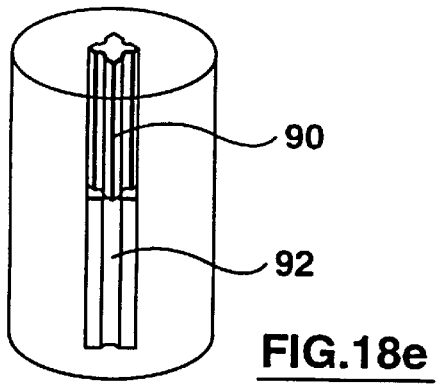
Figure 19B:
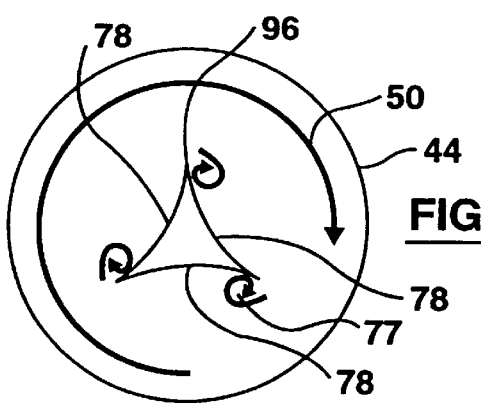
Figure 19A:
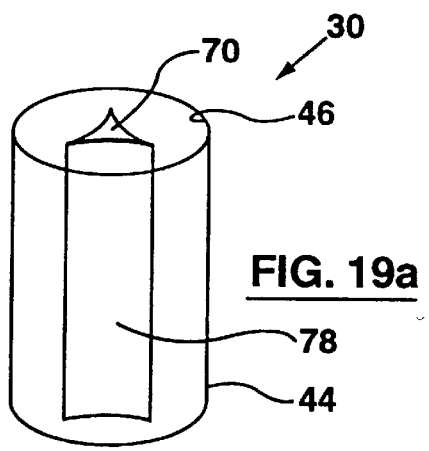
Figure 19D:
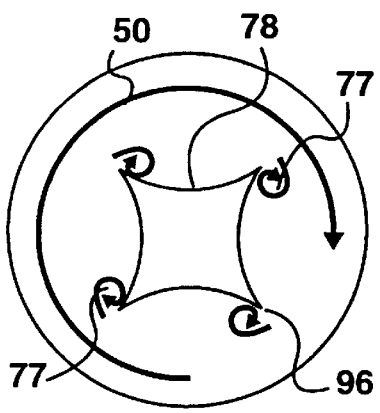
Figure 19C:
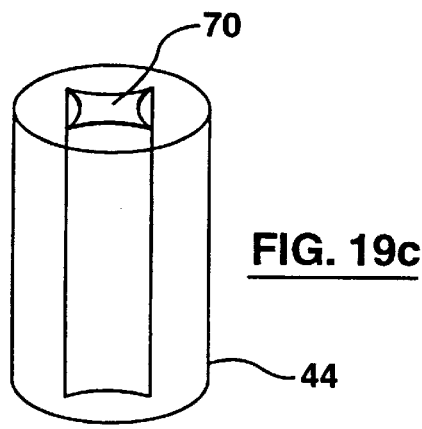
Figure 19F:
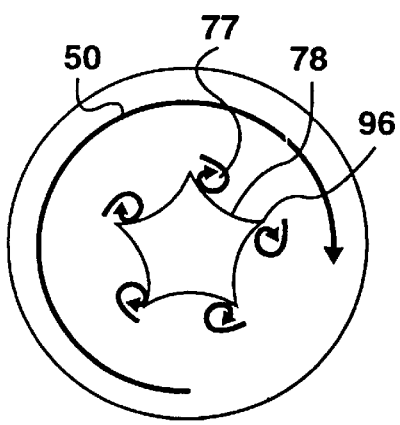
Figure 19E:
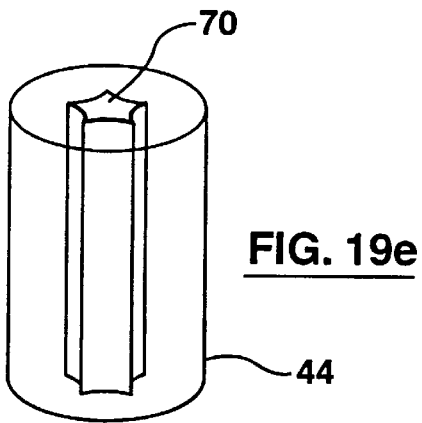
Figure 20B:
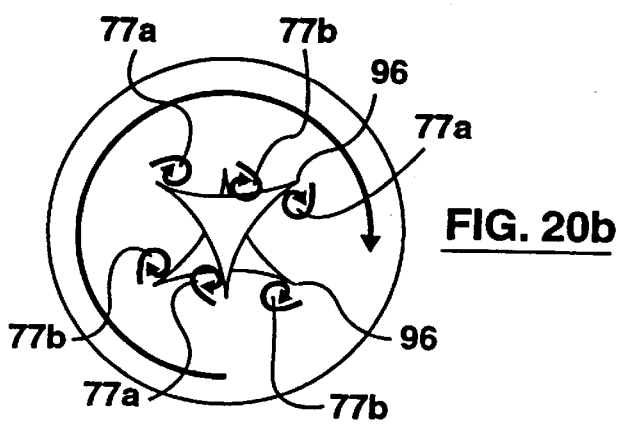
Figure 20A:
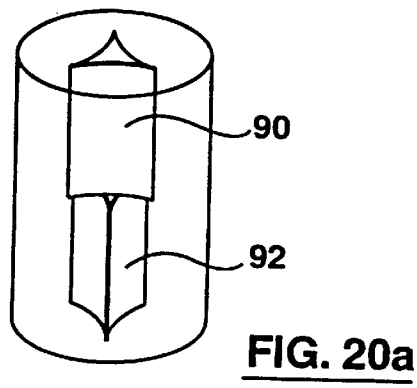
Figure 20D:
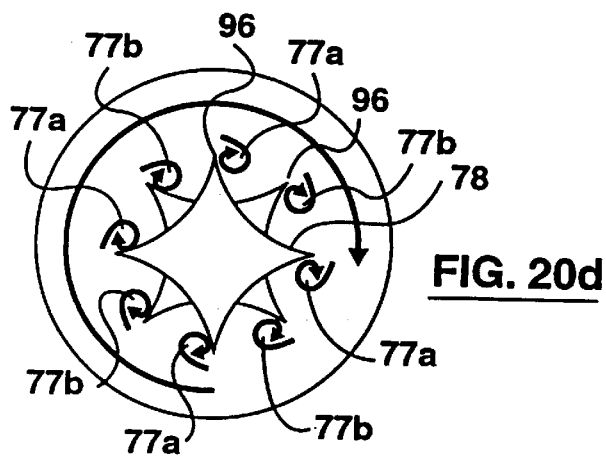
Figure 20C:
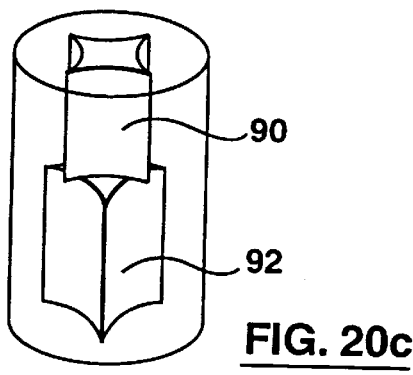
Figure 20F:
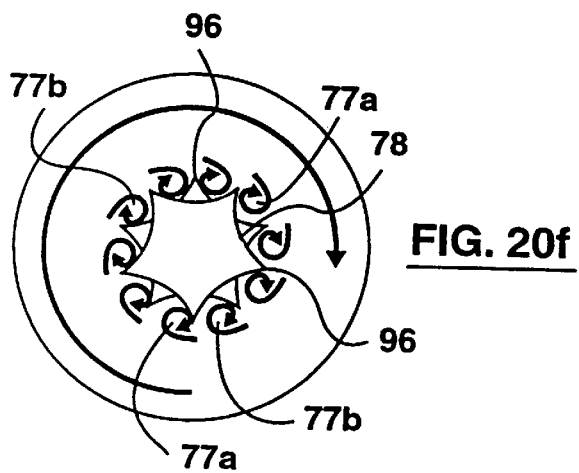
Figure 20E:
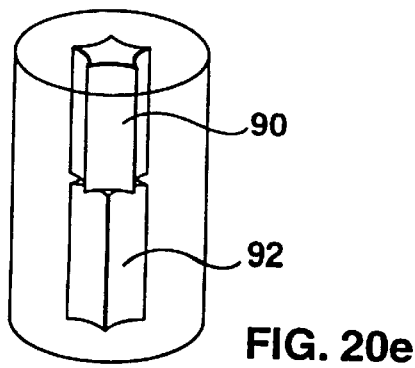

As shown in FIG. 12(a), wall 44 is cylindrical defining a cylindrically extending cavity 42. A thin longitudinally extending rectangular member is centrally positioned therein an is co-terminus with top and bottom ends 32 and 34 of cavity 42. As shown in top plan view in FIG. 12(b), fluid 48 circulates in the direction shown by arrow 50 in cavity 42 thus creating a cyclone that travels around inner surface 46 of wall 44. As referred to herein, the portion of cavity 42 in which fluid 48 so circulates is referred to as the "outer portion" of cavity 42. Internal of the outer portion of cavity 42 is the inner portion of cavity 42. Insert 70 is positioned within the inner portion of cavity 42 and extends radially outwardly into the outer portion of cavity 42 so as to interact with at least a portion of fluid 48 as it rotates within cavity 42. As the radial inner portion of fluid 48 interacts with outer surface 78 of insert 70, a portion of fluid 48 is induced to form a second cyclone 77 within cavity 42. As shown in FIG. 12(b), two second cyclones 77 would be created, each on an opposed surface 78 of insert 70.

In cavity 42, the main cyclone is generally generated by tangentially feeding fluid 48. Second cyclones 77 are preferably generated by configuring insert 70 to create a local pressure differential within the main cyclone. Such local pressure differentials may be created by shearing fluid 48 over outer surface 78 of insert 70 or by boundary layer delimination when the Reynolds number >3,000.

If second cyclone 77 is a rapidly rotating cyclone similar to the cyclone in the outer portion of cavity 42, then second cyclone 77 is designed to promote the separation of material contained in fluid 48. Alternately, second cyclone 77 may be a relatively slow moving cyclone which is designed to create a fluid stream which entrains the material which is separated from fluid 48 by the cyclone in the outer portion of cavity 42 and to transport the separated material 54 downstream to a position external to cavity 42 such as a collecting chamber 62. Further, insert 70 may be configured to spawn one or more second cyclones 77 which rotate in the opposite direction to the cyclone in the outer portion of cavity 42. In another embodiment, insert 70 may be configured to spawn one or more second cyclones 77 which have an axis of rotation different to axis A—A.

Outer surface 78 of wall 76 may be configured to define an area in cavity 42 wherein fluid 48 is travelling at a velocity insufficient to re-entrain all of the material which is separated from fluid stream 48. According to this embodiment, when fluid 48 enters such a low pressure zone or a dead air space 75 internal of the cyclone rotating around inner surface 46, the rate of travel of fluid 48 would diminish sufficiently so that the material contained in fluid 48, which has a different density, would become separated from fluid 48 and may settle downwardly through the dead air space 75 or the low pressure zone without re-entrainment, or at least without substantial re-entrainment, of material 54 into fluid 48.

As shown in FIGS. 12(c)–12(h), the number of second cyclone 77 which will be created will vary depending upon the transverse section of insert 70. Second cyclones 77 increase the separation efficiency of cyclone 30. However, as second cyclone 77 results in a pressure drop in cyclone separator 30, the number and size of second cyclone 77 is preferably selected to produce the desired separation with an acceptable pressure drop. For example, if incoming fluid 48 contains a large particle load and/or fine particles to be separated, then it is preferred to configure insert 70 to spawn one or more second cyclones 77. As the particle load increase, or the particle size decreases, then it is preferred to configure insert 70 to produce an increased number of second cyclones 77. Further, as the size of the particles to be separated decreases, then it is preferred to configure insert 70 to spawn one or more cyclones having a smaller diameter.

As shown in FIGS. 13(a)–13(h), a plurality of inserts may be provided, one positioned above the other. If two or more inserts are used, each of which has a different configuration, then different second cyclones 77 may be created, each of which is designed to remove particles having a different size distribution. Thus second cyclones 77 which have a different $d_{50}$ value may be produced. It will be appreciated that if insert 70 has a non-symmetrical transverse section, then second cyclones 77 having different $d_{50}$ values may be created by the same insert. Alternately each insert 70 may create one or more second cyclones 77 having the same $d_{50}$ value and different inserts 70 are used to spawn second cyclones 77 having a different $d_{50}$ value.

Preferably, as shown in FIGS. 13(a)–13(h), an upper insert 90 is positioned immediately above lower insert 92 so as to, in effect, define a continuous insert. Further, a shown in FIGS. 13(a)–13(h), upper insert 90 may be rotated at 90° with respect to lower insert 92 and, as shown in FIGS. 14(a)–14(h), upper insert 90 may be rotated at an angle other than 90° with respect to lower insert 92. According to this embodiment, each second cyclone 77 would exist for only part of the longitudinal length F of cavity 42. For example, referring to FIGS. 13(a), (b), insert 90 would create second cyclones 77a having one particular $d_{50}$ value which would extend along length h1 of cyclone separator 30. Lower insert 92 would create second cyclones 77(b) having another $d_{50}$ value which would extend along length h2 of cyclone separator 30.

As shown in FIGS. 15(a)–15(h), upper and lower inserts 90 and 92 may be of different shapes which are centred one above the other. Alternately, as shown in FIGS. 16(a)–16(h), upper and lower inserts 90 and 92 may be of different shapes and may be radially offset from each other.

In the preferred embodiment shown in FIGS. 17(a)–17(f), insert 70 is provided with recesses 94 in outer surface 78 of insert 70. At least one recess 94 is provided on insert 70 and, preferably, at least one recess 94 is provided on each outer surface 78 of insert 70. Recess 94 defines a dead air space (a region of low velocity or low flow) between second cyclones 77 within which the separated material may travel to bottom end 32 without substantial re-entrainment and, preferably, without any significant re-entrainment. The creation of dead air spaces 75 are beneficial if fluid 48 has a large load of contained material which is to be removed by one or more cyclone separators 30.

As discussed above, cyclone separator 30 may be provided with a plurality of inserts 70 each of which has recesses 94 provided in surfaces 78 thereof. These inserts may be rotated at a 90° angle with respect to each other as shown in FIGS. 18(a)–18(f). Alternately, upper and lower inserts 90 and 92 may be rotated at an angle other than 90° with respect to each other or they may be offset from each other or they may be of differing shapes.

In the preferred embodiment shown in FIGS. 19(a)–19(f), outer surfaces 78 of insert 70 are concave or "bow" shaped and have a plurality of sections 96 between adjacent "bow" shaped outer surfaces 78. Sections 96 interact with a portion of fluid 48 rotating along wall 44 to direct a portion of fluid 48 into the inner portion of cavity 42 thus assisting in the creation of second cyclones 77. Such upper and lower inserts 90 and 92 may be of any particular shape as discussed above and may be positioned with respect to each other in any manner as discussed above. For example, as shown in FIGS. 20(a)–20(f), two inserts 70 having concave outer surfaces 78 may be positioned one above the other and rotated at a regular angle with respect to each other.

Figure 21B:
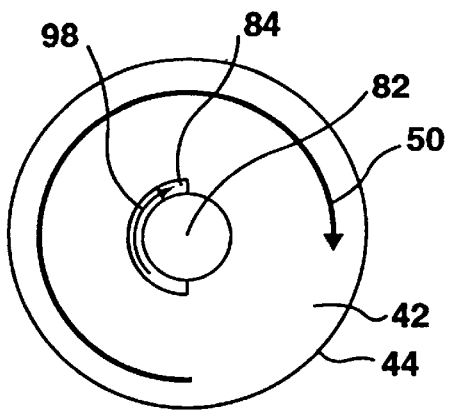
Figure 21A:
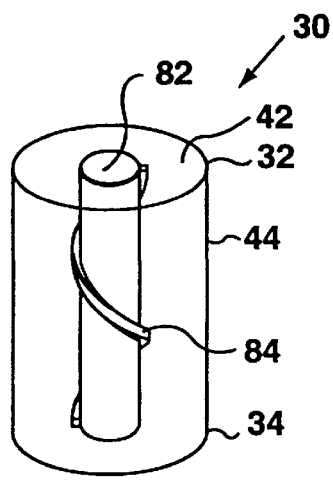
Figure 21D:
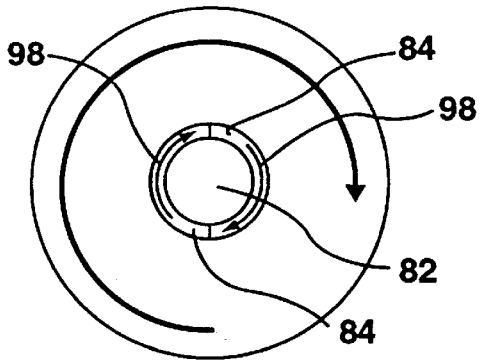
Figure 21C:
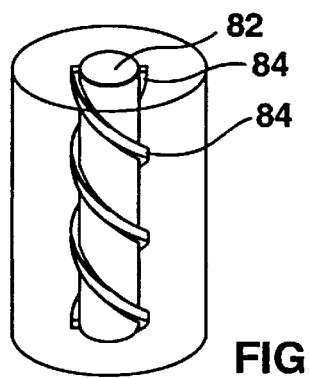
Figure 21F:
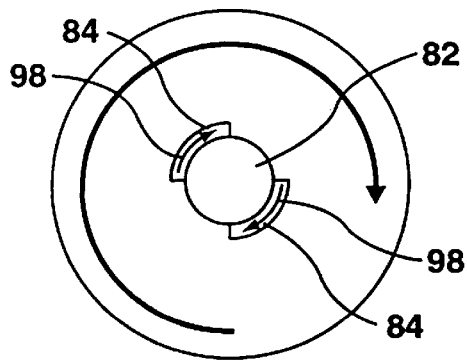
Figure 21E:
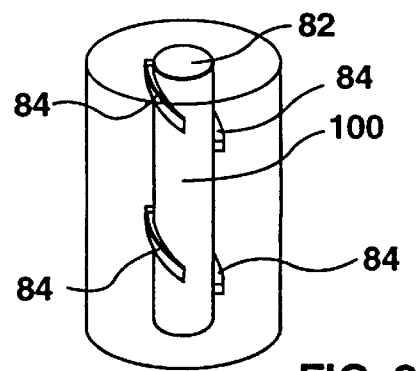
Figure 22A:
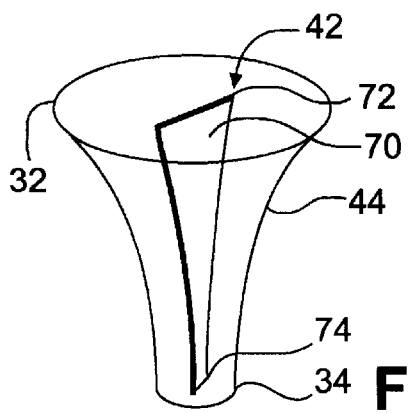
Figure 22B:
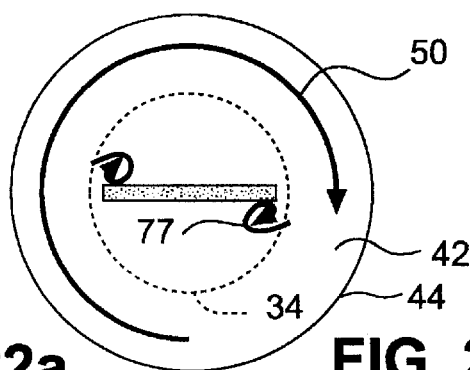
Figure 22C:
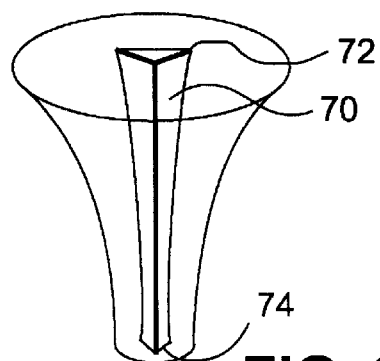
Figure 22D:
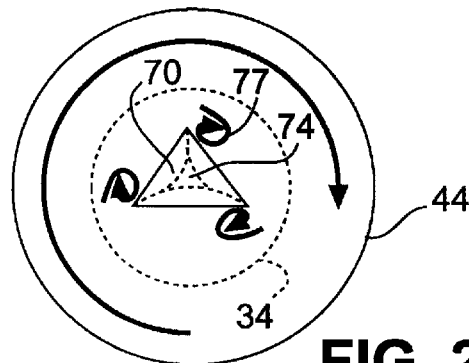
Figure 22E:
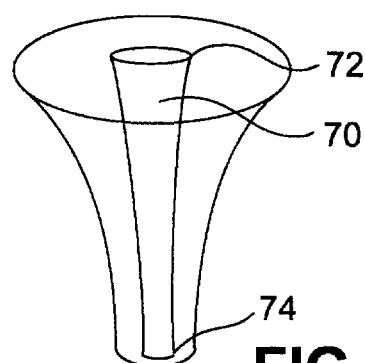
Figure 22F:
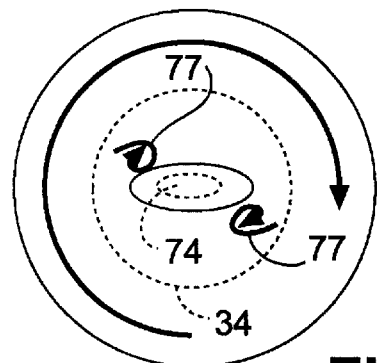
Figure 22G:
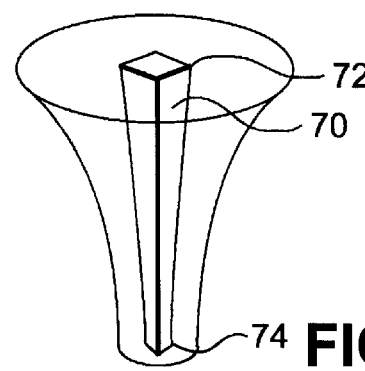
Figure 22H:
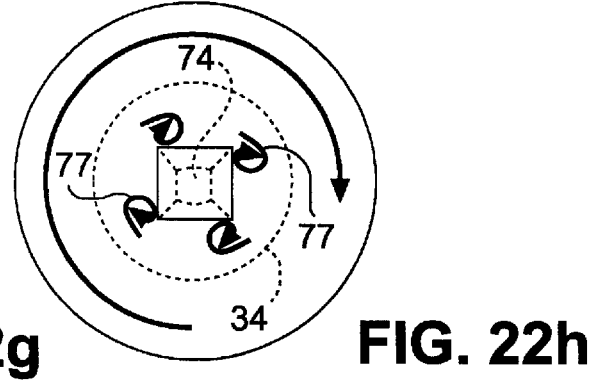
Figure 23A:
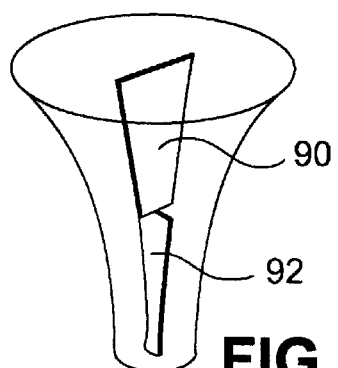
Figure 23B:
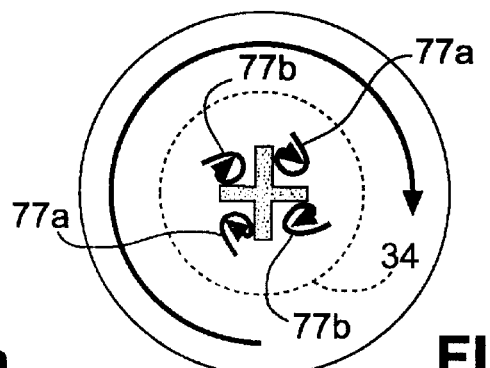
Figure 23C:
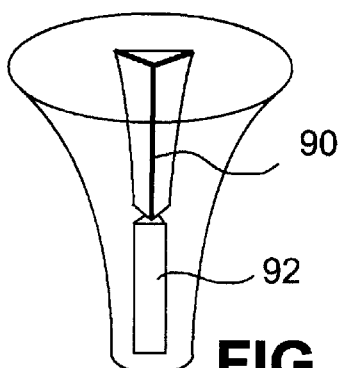
Figure 23D:
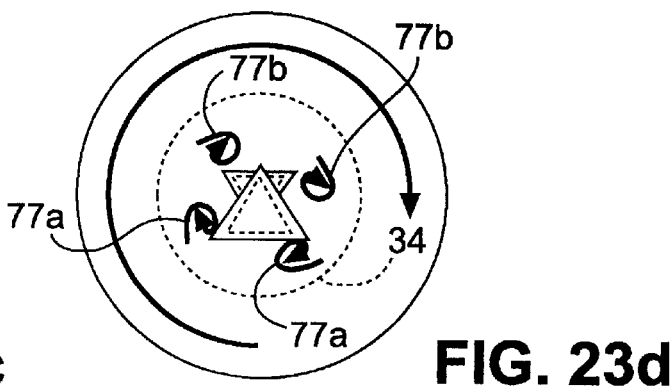
Figure 23E:
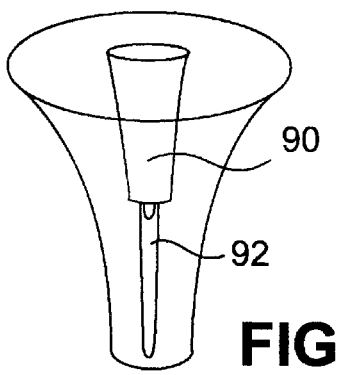
Figure 23F:
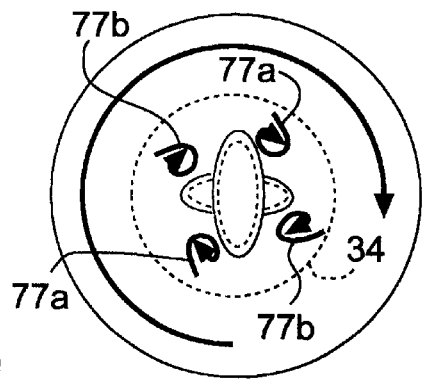
Figure 23G:
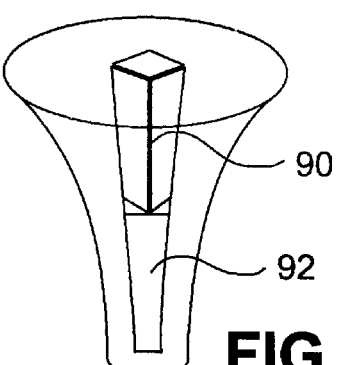
Figure 23H:
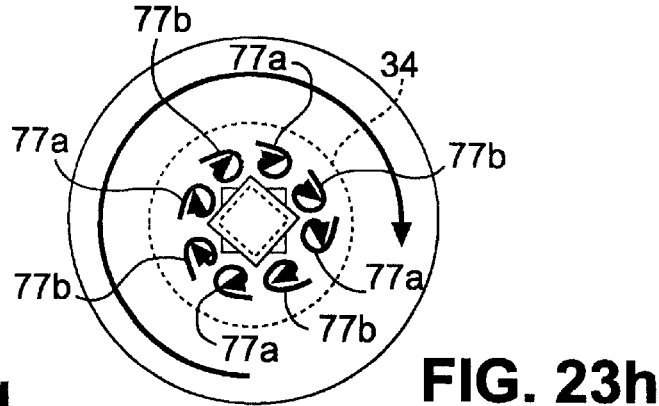
Figure 24A:
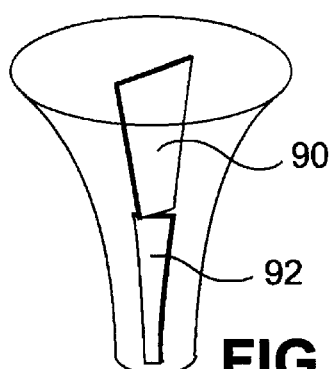
Figure 24B:
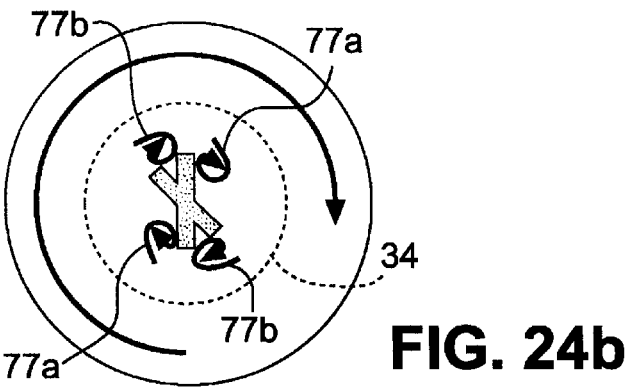
Figure 24C:
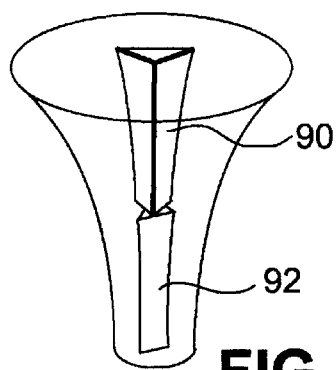
Figure 24D:
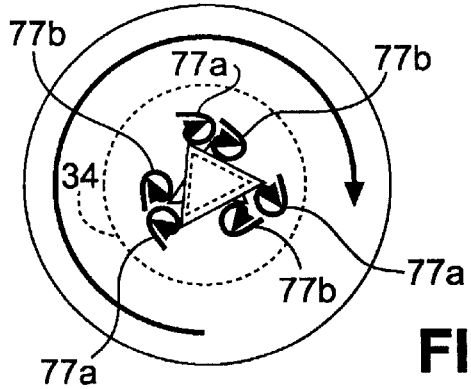
Figure 24E:
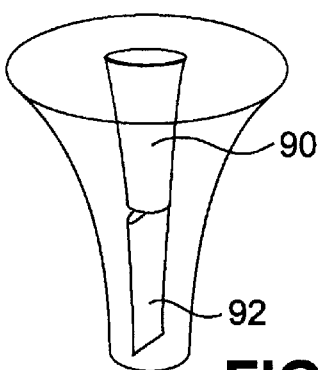
Figure 24F:
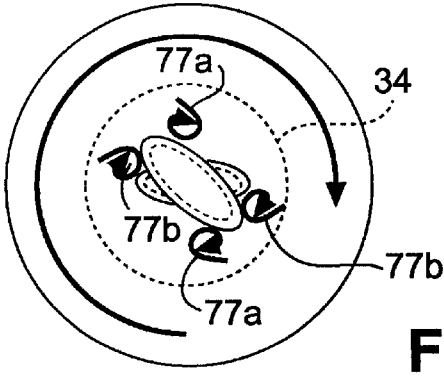
Figure 24G:
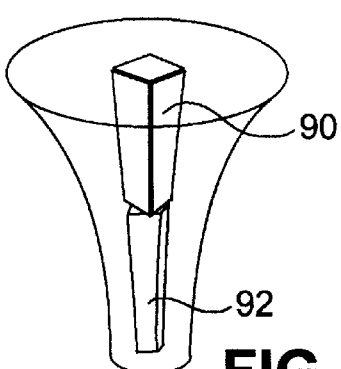
Figure 24H:
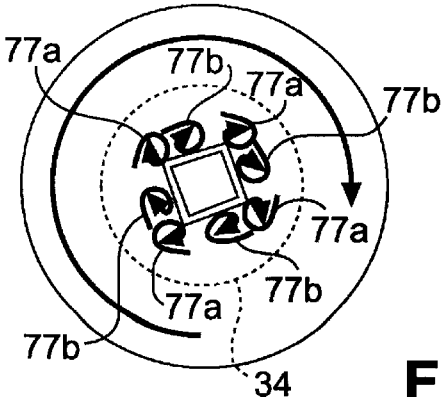
Figure 25B:
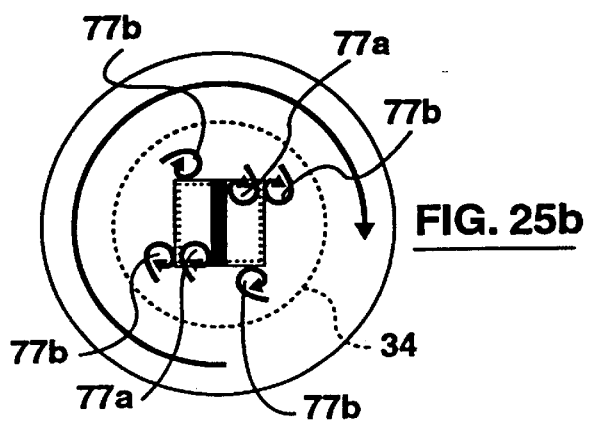
Figure 25A:
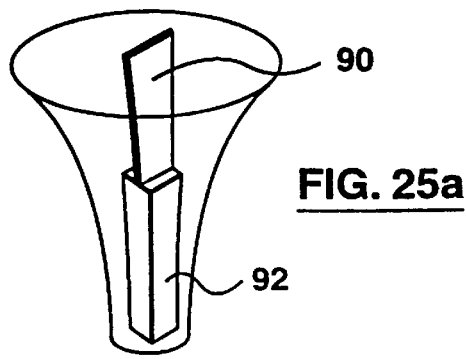
Figure 25D:
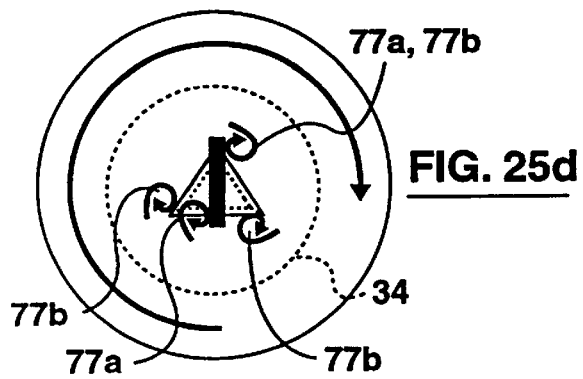
Figure 25C:
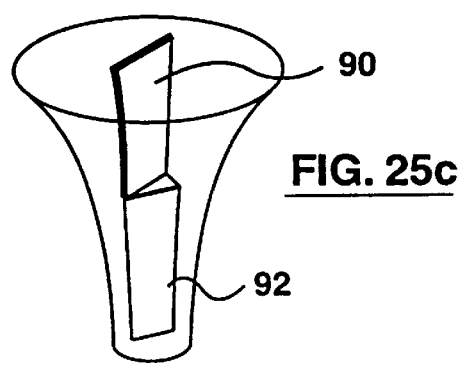
Figure 25F:
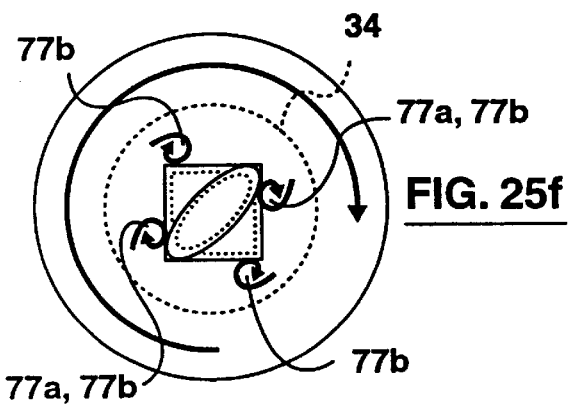
Figure 25E:
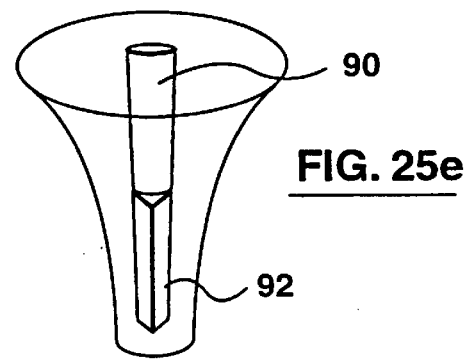
Figure 25H:
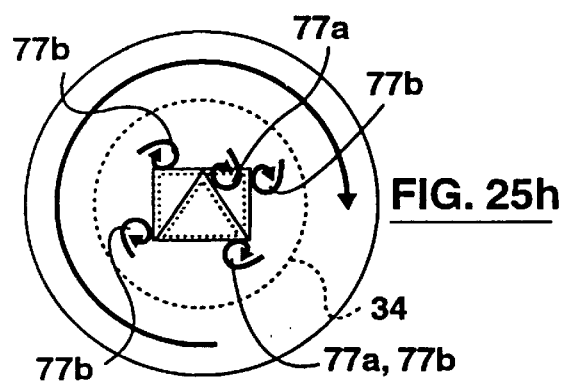
Figure 25G:
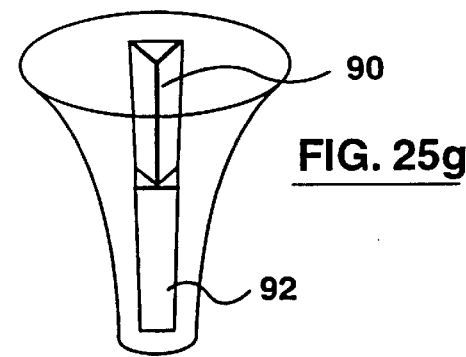
Figure 26B:
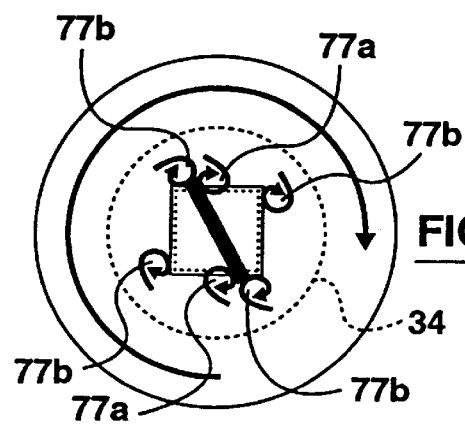
Figure 26A:
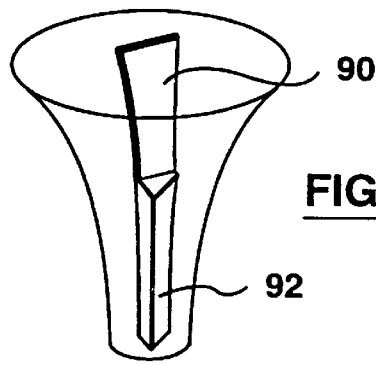
Figure 26D:
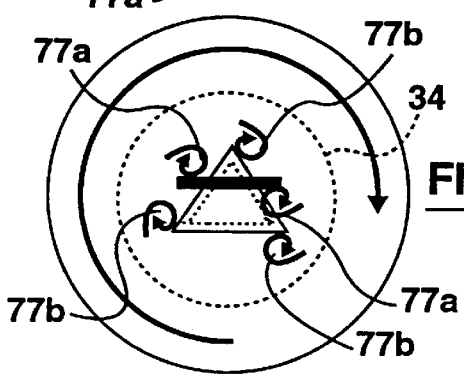
Figure 26C:
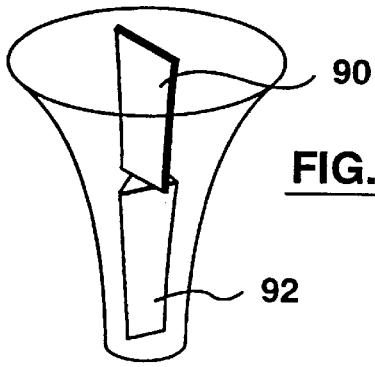
Figure 26F:
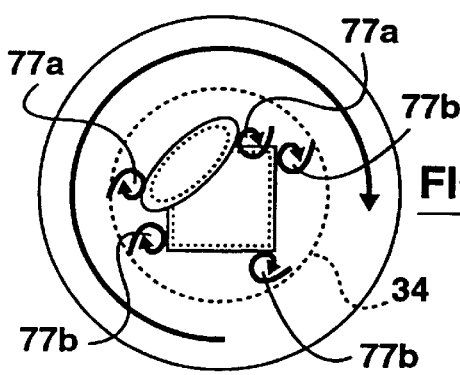
Figure 26E:
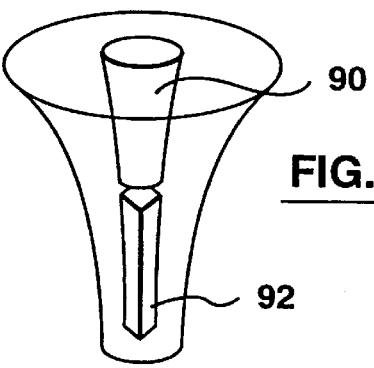
Figure 26H:
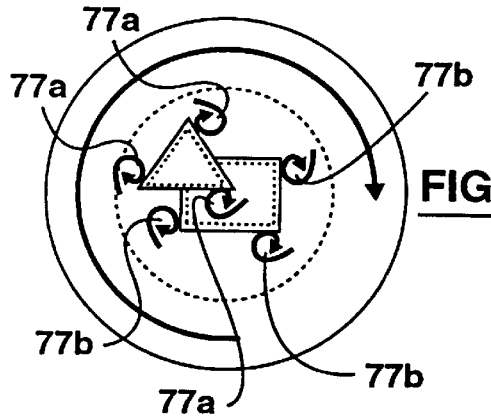
Figure 26G:
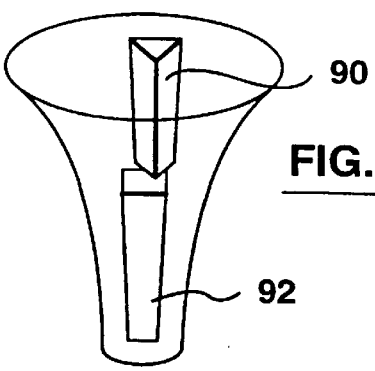
Figure 27A:
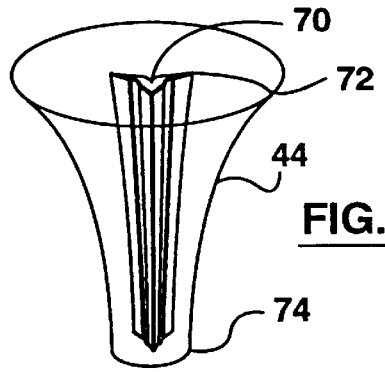
Figure 27B:
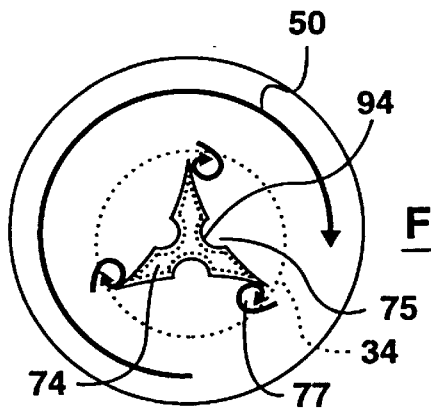
Figure 27C:
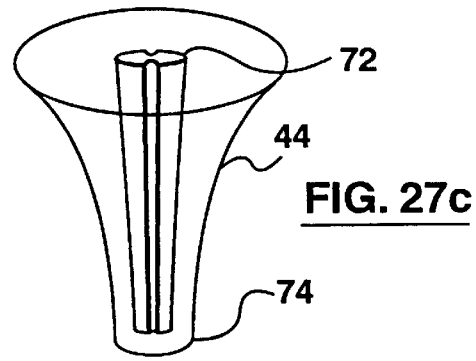
Figure 27D:
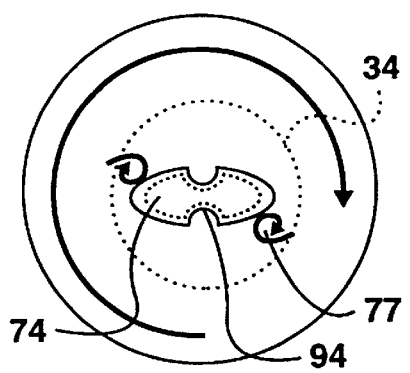
Figure 27E:
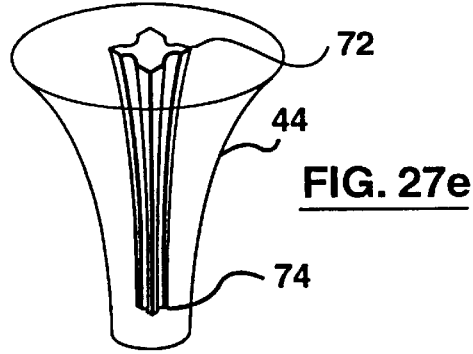
Figure 27F:
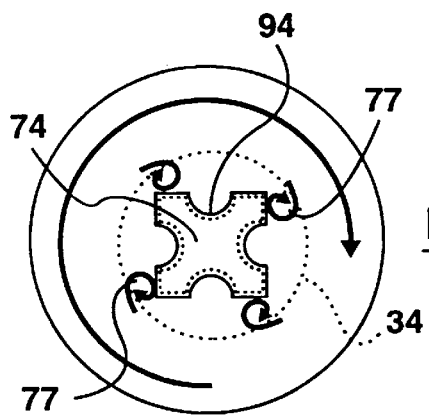
Figure 28B:
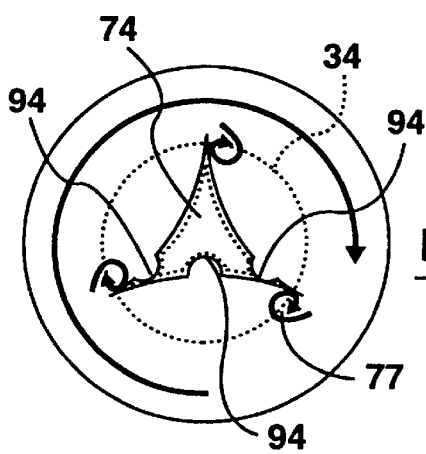
Figure 28A:
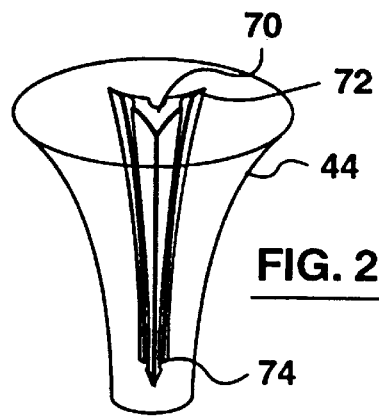
Figure 28D:
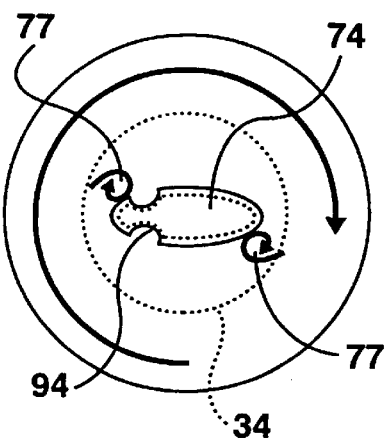
Figure 28C:
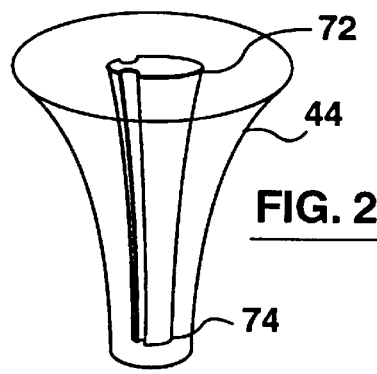
Figure 28F:
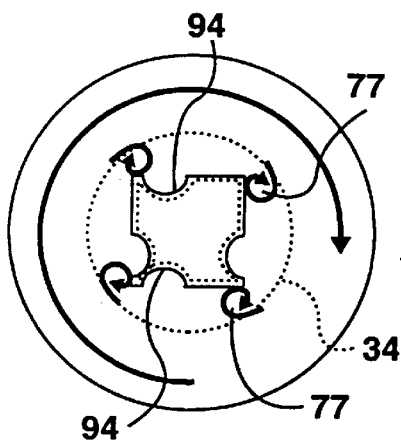
Figure 28E:
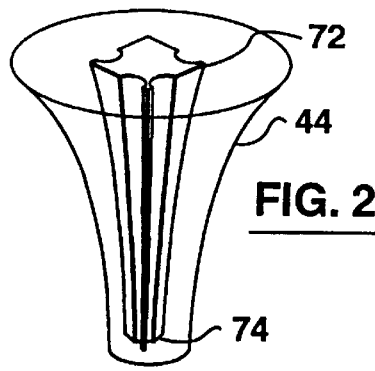
Figure 29A:
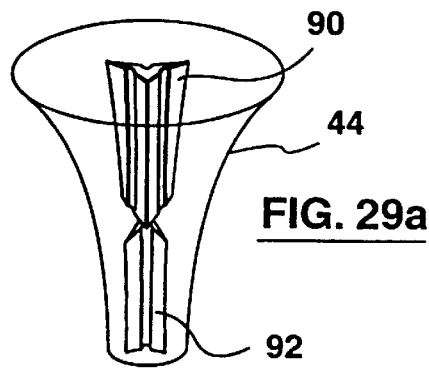
Figure 29B:
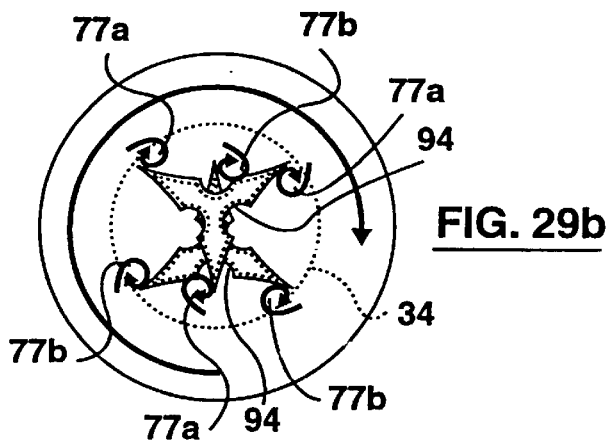
Figure 29C:
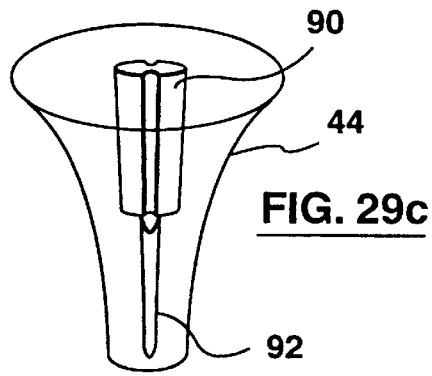
Figure 29D:
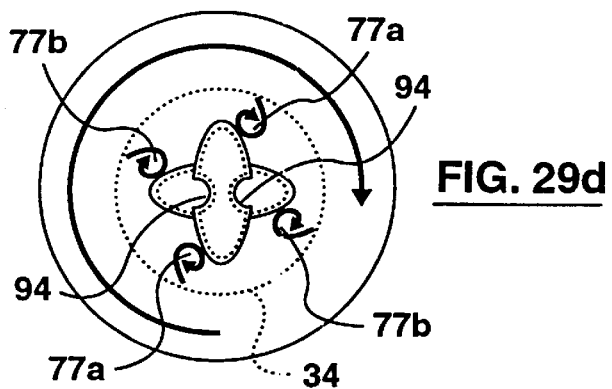
Figure 29E:
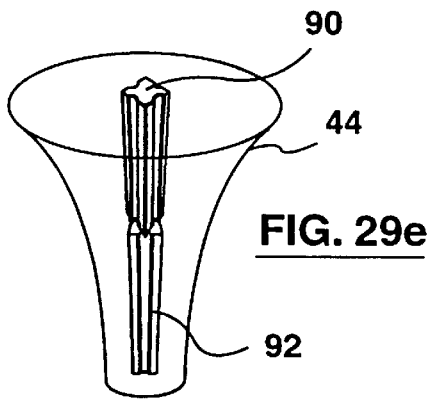
Figure 29F:
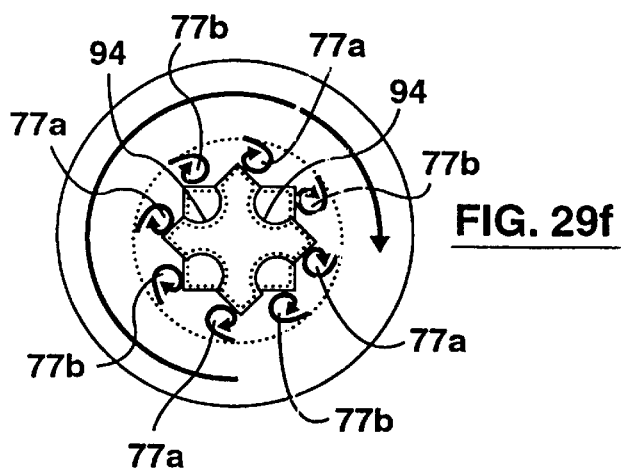
Figure 30B:
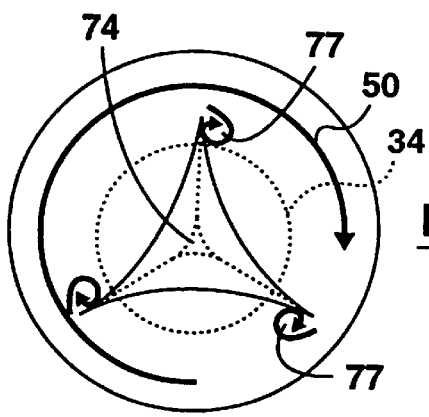
Figure 30A:
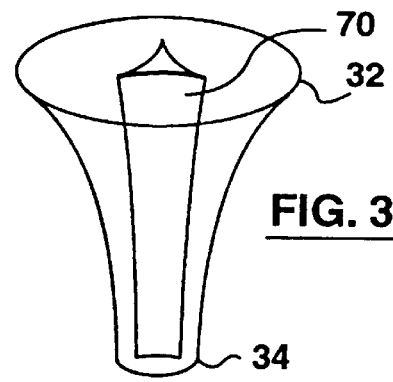
Figure 30D:
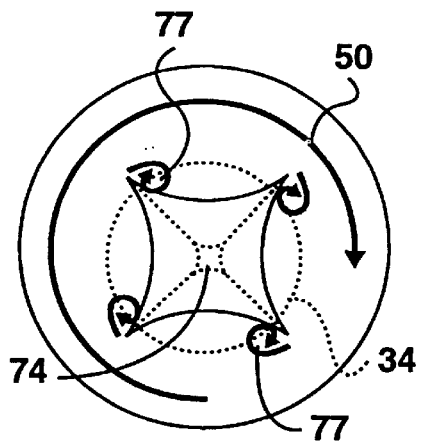
Figure 30C:
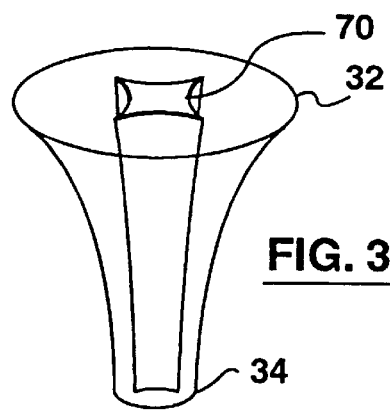
Figure 30F:
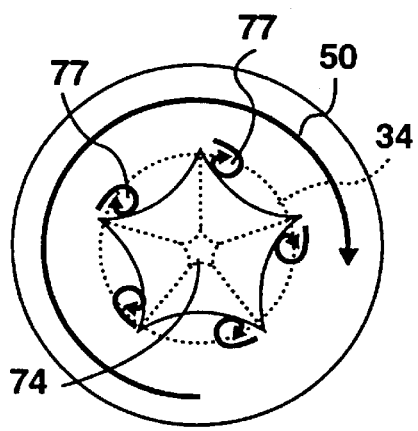
Figure 30E:
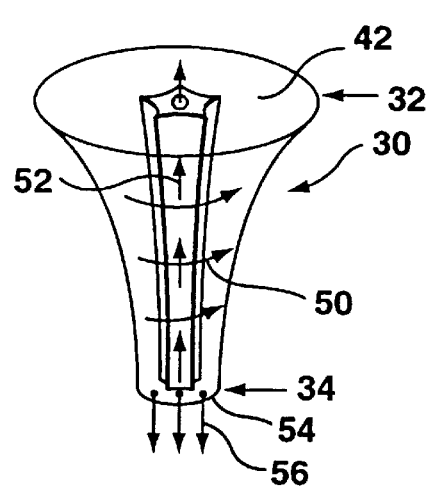
Figure 31B:
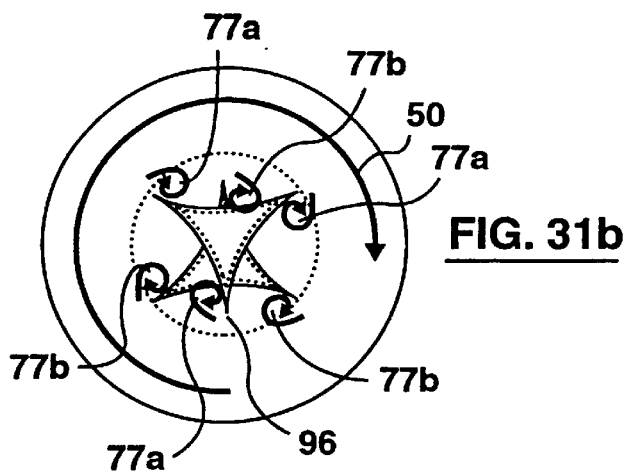
Figure 31A:
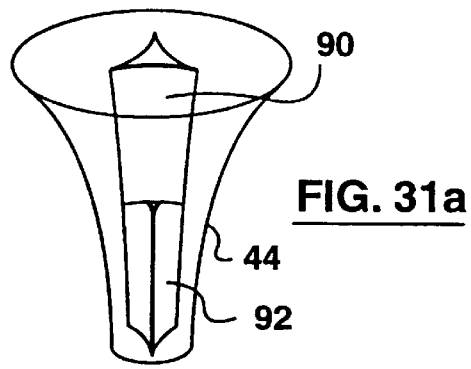
Figure 31D:
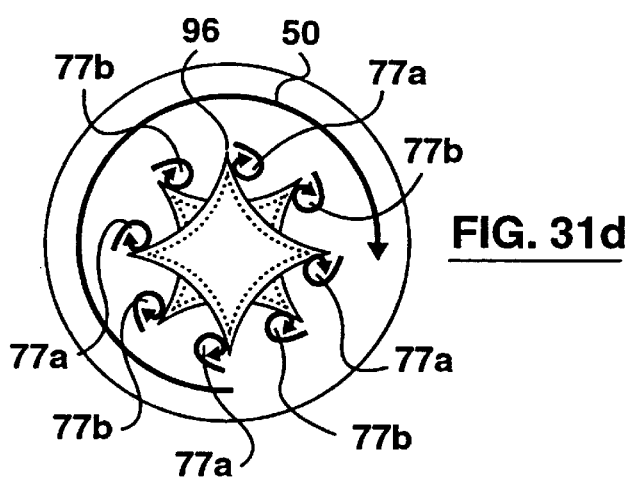
Figure 31C:
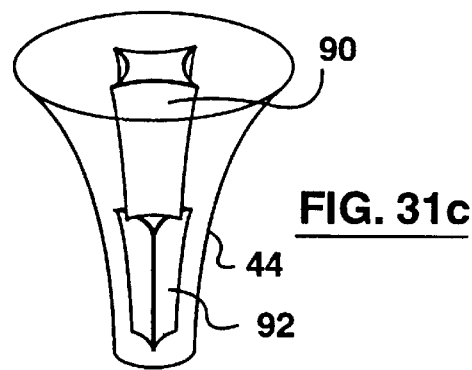
Figure 31F:
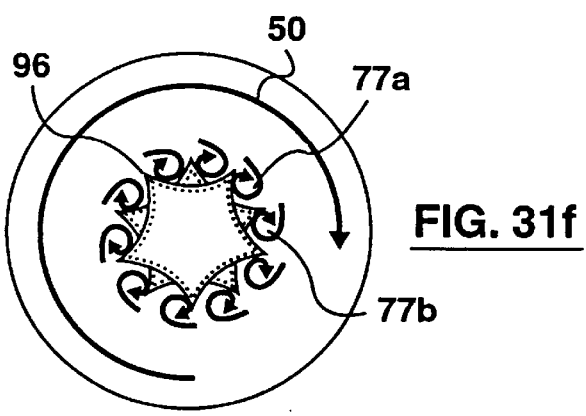
Figure 31E:
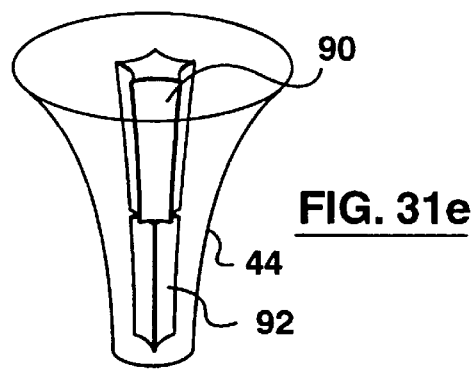
Figure 32B:
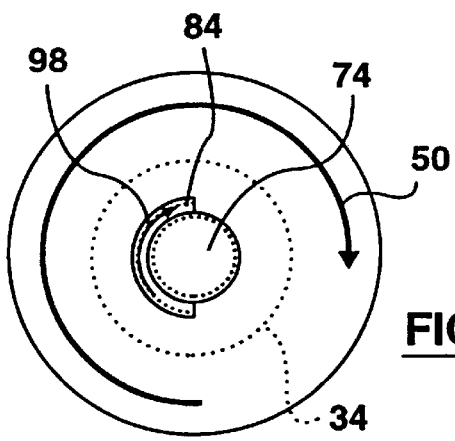
Figure 32A:
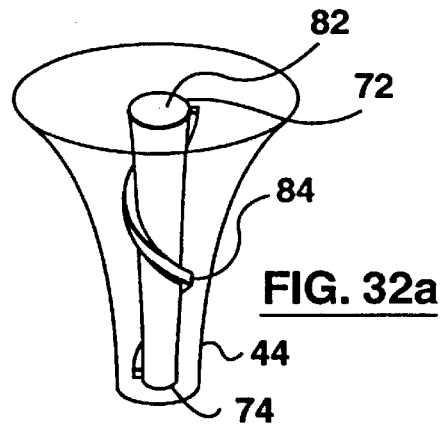
Figure 32D:
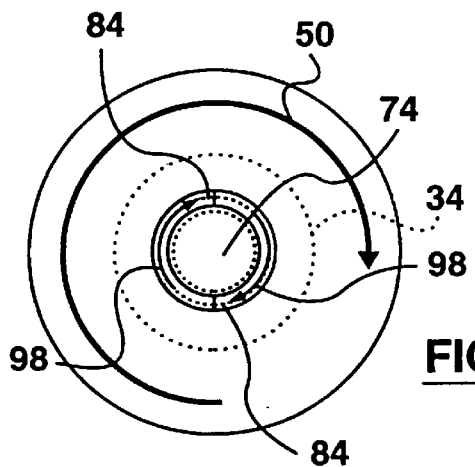
Figure 32C:
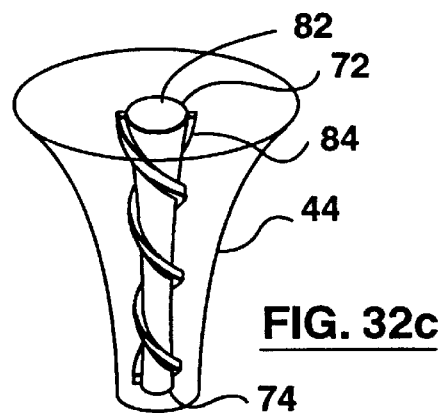
Figure 32F:
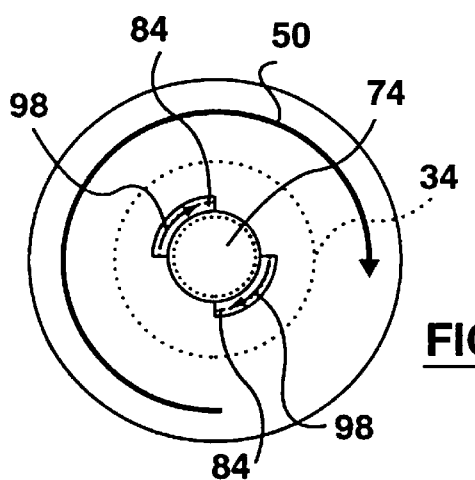
Figure 32E:
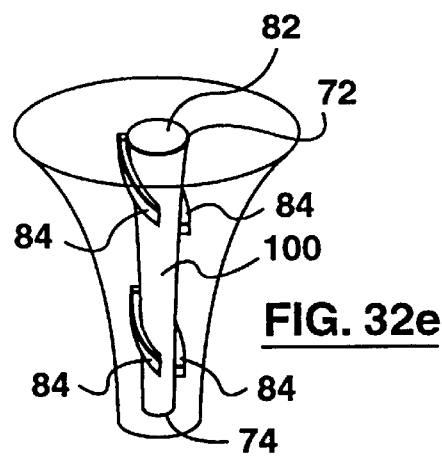

As shown in FIGS. 21(a)–21(b), insert 70 may have a longitudinally extending central core 82 having a single helical vane 84 positioned there around causing fluid 48 to travel there along in the direction of arrow 98. A first or outer cyclone rotates in the outer portion of cavity 42 around wall 44.

In an alternate embodiment shown in FIGS. 21(*c*) and (*d*), insert 70 may have two helical vanes 84 which are symmetrically positioned around core 82. Alternately, as shown in FIGS. 21(*e*) and 21(*f*), each helical vane 84 may be discontinued along central portion 100 of core 82 thus effectively creating an upper set of helical vanes 84 and a lower set of helical vanes 84. Helical insert have a wide $d_{50}$ range compared with other inserts. Therefore, a helical insert is preferred if the contained particles in fluid 48 have a wide particle size range.

FIGS. 22(*a*)–22(*h*) through 32(*a*)–32(*f*) show a similar series of configurations to those shown in FIGS. 12(*a*)–12(*h*) through 21(*a*)–21(*f*). The main difference between the series of drawings is that in the latter series, cavity 42 is cylindrical in shape as defined by wall 44. In the former series, outer wall 44 is trumpet shaped such that the diameter of cavity 42 narrows from upper end 32 to bottom end 34. Accordingly, it is preferred in such an embodiment that insert 70 narrows from upstream end 72 to downstream end 74. A trumpet shaped outer wall 44 produces a main cyclone having a wide $d_{50}$ range compared with the cyclone created by a cylindrical wall 44 and is preferred if the contained particles in fluid 48 have a wide particle size range.

In the longitudinal direction defined by axis A—A, inner surface 46 is continuous. By this term, it is meant that, while inner surface 46 may change direction longitudinally, it does so gradually so as not to interrupt the rotational movement of fluid 48 within cavity 42. It will be appreciated that, in the longitudinal and/or the transverse direction, that inner surface 46 of cavity 42 and/or outer surface 78 of wall 76 may be defined by a plurality of straight line portions, each of which extends for a finite length. Inner surface 46 may be defined by 3 or more such segments, preferably 5 or more such segments and most preferably, 10 or more such segments.

It will also be appreciated that, depending upon the degree of material which is required and the composition of the material in the fluid to be treated that a plurality of cyclone separators each of which, or only some of which, may be connected in series. The plurality of separators may be positioned side by side or nested (one inside the other) as is shown in FIG. 10.

It will also be appreciated that if cyclone separator 30 is a reverse flow cyclone, that insert 70 may be hollow, (see for example FIG. 30(*e*)) so as to provide an internal passage through which fluid 48 may travel after material 54 has been separated therefrom.

We claim:

1. An insert for a cyclone separator for separating a material from a fluid, the separator having a longitudinally extending body and a wall, the wall having an inner surface and defining an internal cavity having an outer portion in which the fluid rotates when the separator is in use to define a first cyclone and an inner portion, the insert comprising a distinct member having an outer wall, the insert is positioned at least partially within the inner portion to impinge upon at least a portion of the fluid as it rotates within the cavity to produce at least one second cyclone interior to the first cyclone and a low velocity zone in which material separated from the fluid travels longitudinally through the cyclone separator while permitting the fluid to maintain sufficient momentum to continue its rotational motion within the outer portion.

2. The insert as claimed in claim 1 wherein the insert is centrally positioned within the cavity and extends outwardly from the inner portion to impinge upon the portion of the fluid which is rotating to define the first cyclone.

3. The insert as claimed in claim 1 wherein the outer wall of the insert is configured to create an area in the cavity wherein the fluid is travelling at a velocity insufficient to re-entrain all of the separated material.

4. The insert as claimed in claim 3 wherein the area extends longitudinally and has a receiving portion for receiving the material which is separated from the fluid.

5. The insert as claimed in claim 4 wherein the separator is vertically disposed and the receiving portion is positioned towards the lower end of the separator and comprises a collecting chamber in which the separated material is collected.

6. The insert as claimed in claim 4 wherein the separator is vertically disposed and the receiving portion is positioned towards the lower end of the separator and is in flow communication with a chamber downstream thereof.

7. The insert as claimed in claim 3 wherein the area extends longitudinally for a finite length and the insert is configured to create a plurality of areas at spaced intervals along at least a portion of the length of the insert.

8. The insert as claimed in claim 1 wherein the outer wall of the insert is configured to produce a boundary layer and material separated from the fluid by the second cyclone travels with the boundary layer longitudinally through the cyclone separator without substantial re-entrainment.

9. The insert as claimed in claim 8 wherein the outer wall of the insert has at least one recess provided therein.

10. An insert for a cyclone separator for separating a material from a fluid, the separator having a longitudinally extending body and a wall, the wall having an inner surface and defining an internal cavity in which the fluid rotates when the separator is in use to define a first cyclone, the insert comprising a member having an outer wall spaced from the inner surface and configured to produce at least one second cyclone internal to the first cyclone and to hinder re-entrainment of material separated from the fluid by the at least one second cyclone.

11. The insert as claimed in claim 10 wherein the outer wall configured to impart changes in the rate of acceleration to the portion of the fluid as it rotates within the cavity.

12. The insert as claimed in claim 10 wherein the insert is centrally positioned within the cavity and extends outwardly to impinge upon the portion of the fluid.

13. The insert as claimed in claim 10 wherein the outer wall of the insert is configured to create an area in the cavity wherein the fluid is travelling at a velocity insufficient to re-entrain all of the separated material.

14. The insert as claimed in claim 13 wherein the area extends longitudinally and has a receiving portion for receiving the material which is separated from the fluid.

15. The insert as claimed in claim 13 wherein the area extends longitudinally for a finite length and the insert is configured to create a plurality of areas at spaced intervals along at least a portion of the length of the insert.

16. The insert as claimed in claim 14 wherein the separator is vertically disposed and the receiving portion is positioned towards the lower end of the separator and comprises a collecting chamber in which the separated material is collected.

17. The insert as claimed in claim 14 wherein the separator is vertically disposed and the receiving portion is positioned towards the lower end of the separator and is in flow communication with a chamber downstream thereof.

18. The insert as claimed in claim 10 wherein the outer wall of the insert is configured to produce a boundary layer and material separated from the fluid by the second cyclone travels with the boundary layer longitudinally through the cyclone separator.

19. The insert as claimed in claim 18 wherein the outer wall of the insert has at least one recess provided therein.

20. An insert for a cyclone separator for separating a material from a fluid, the separator having a longitudinally extending body defining a longitudinal axis and a wall, the wall having an inner surface which defines an internal cavity having an outer portion in which the fluid rotates when the separator is in use to define a first cyclone and an inner portion, the insert comprising a member positioned in the inner portion and having an outer wall which is positioned to interact with at least a portion of the fluid as it rotates in the outer portion of the cavity thereby defining a second cyclone to impart to the portion of the fluid different fluid flow characteristics compared to those of the fluid rotating in the outer portion of the cavity which promote the separation of the material from the fluid and hinder re-entrainment in the outer portion of material separated from the fluid.

21. The insert as claimed in claim 20 wherein the outer wall of the insert is positioned and configured to direct the portion of the fluid into the inner portion of the cavity.

22. The insert as claimed in claim 20 wherein the outer wall of the insert interacts with the portion of the fluid to impart to the portion of the fluid a different speed, a different direction of travel or a different velocity compared to that of the fluid rotating in the outer portion of the cavity.

23. The insert as claimed in claim 20 wherein the outer wall of the insert is configured to interact with the portion of the fluid to create a low velocity zone between the outer wall of the insert and the outer portion of the cavity.

24. The insert as claimed in claim 23 wherein the low velocity zone extends longitudinally for a finite length and a plurality of dead air spaces are provided at spaced intervals along at least a portion of the length of the insert.

25. The insert as claimed in claim 23 wherein the low velocity zone extends longitudinally and has a receiving portion for receiving the material which is separated from the fluid in the dead air space.

26. The insert as claimed in claim 25 wherein the separator is vertically disposed and the receiving portion is positioned towards the lower end of the separator and comprises a collecting chamber in which the separated material is collected.

27. The insert as claimed in claim 25 wherein the separator is vertically disposed and the receiving portion is positioned towards the lower end of the separator and is in flow communication with a chamber downstream thereof.

28. The insert as claimed in claim 20 wherein the outer wall of the insert is configured to produce a boundary layer and material separated from the fluid by the second cyclone travels with the boundary layer longitudinally through the cyclone separator.

29. The insert as claimed in claim 28 wherein the outer wall of the insert has at least one recess provided therein.

30. The insert as claimed in claim 20 wherein, in transverse section, the shape of the insert is circular.

31. The insert as claimed in claim 20 wherein, in transverse section, the shape of the insert is a polygon.

32. The insert as claimed in claim 20 wherein the insert comprises a continuous n-differentiable curve wherein $n \geq 2$ and the second differential is not zero everywhere swept 360 degrees around the longitudinal axis.

33. The insert as claimed in claim 20 wherein, in transverse section, the shape of the insert is a closed non-circular convex closed path.

34. The insert as claimed in claim 20 wherein the insert comprises a helix.

35. The insert as claimed in claim 20 wherein the insert is centrally positioned within the cavity and extends outwardly to impinge upon the portion of the fluid.

36. A cyclone separator for separating a material from a fluid comprising:

(a) a longitudinally extending body having a wall and defining a longitudinal axis, the wall having an inner surface which defines an internal cavity having an outer portion in which the fluid rotates when the separator is in use thereby defining an outer cyclone and an inner portion; and, (b) an insert comprising a member having an outer wall spaced from the inner surface and positioned to interact with at least a portion of the fluid as it rotates in the outer portion of the cavity thereby defining at least one inner cyclone to impart to that portion of the fluid with which it interacts different fluid flow characteristics compared to those of the fluid rotating in the outer portion of the cavity which promote the separation of the material from the fluid at a position interior to the outer portion without substantial re-entrainment of material separated from the fluid.

37. The separator as claimed in claim 36 wherein the outer wall of the insert spaced at least 0.1 inches from the inner surface.

38. The separator as claimed in claim 36 wherein at least a portion of the inner surface and at least a portion of the outer wall of the insert each have a portion which is similarly configured.

39. The separator as claimed in claim 36 wherein at least a portion of the inner surface and at least a portion of the outer wall of the insert are each in the shape of a continuous n-differentiable curve wherein $n \geq 2$ and the second differential is not zero everywhere swept 360 degrees around the longitudinal axis.

40. The separator as claimed in claim 36 wherein at least a portion of the inner surface of the wall is configured to continuously impart changes in the rate of acceleration to the fluid as it rotates within the cavity.

41. The separator as claimed in claim 36 wherein at least a portion of the inner surface of the wall is defined by a continuous n-differentiable curve swept 360 degrees around the axis wherein $n \geq 2$ and the second derivative is not zero everywhere.

42. The separator as claimed in claim 36 wherein at least a portion of the inner surface of the wall is defined by a plurality of straight lines which approximate a continuous n-differentiable curve swept 360 degrees around the axis wherein $n \geq 2$ and the second derivative is not zero everywhere.

43. The separator as claimed in claim 36 wherein the inner portion is contiguous with the outer portion, the outer portion of the cavity defining the outer cyclone as a zone in which at least a portion of the fluid rotates, the insert is configured so that fluid in the inner portion of the cavity rotates defines the at least one inner cyclone interior of the outer cyclone.

44. The separator as claimed in claim 43 wherein in transverse section, the wall extends in a continuous closed path the internal cavity having at least one external portion positioned exterior to the outer portion and contiguous therewith defining a zone in which the wall is configured to produce an external cyclone exterior to the outer cyclone and to hinder re-entrainment in the portion of material separated from the fluid.

45. The separator as claimed in claim 36 wherein the inner surface of the wall is defined by, in transverse section, a continuous non-circular convex closed path, the cavity having an inner portion positioned within the non-circular convex closed path and at least one outer portion between the inner portion and the non-circular convex closed path.

46. The separator as claimed in claim 36 wherein the outer wall of the insert is configured to produce a local pressure differential within the inner portion.

47. The separator as claimed in claim 46 wherein the local pressure differential is produced by shearing fluid over a discontinuity in the outer wall of the insert.

48. The separator as claimed in claim 46 wherein the wall is configured to produce a boundary layer flow and the local pressure differential is produced by configuring the outer wall of the insert to increase the boundary layer flow to a Reynolds number greater than 3000.

* * * * *